US010323178B2

(12) United States Patent
Sotzing et al.

(10) Patent No.: US 10,323,178 B2
(45) Date of Patent: Jun. 18, 2019

(54) COLOR TUNING OF ELECTROCHROMIC DEVICES USING AN ORGANIC DYE

(71) Applicant: THE UNIVERSITY OF CONNECTICUT, Farmington, CT (US)

(72) Inventors: Gregory Allen Sotzing, Storrs, CT (US); Michael A. Invernale, West Haven, CT (US)

(73) Assignee: THE UNIVERSITY OF CONNECTICUT, Farmington, CT (US)

(*) Notice: Subject to any disclaimer, the term of this patent is extended or adjusted under 35 U.S.C. 154(b) by 223 days.

(21) Appl. No.: 14/712,389

(22) Filed: May 14, 2015

(65) Prior Publication Data
US 2015/0331293 A1 Nov. 19, 2015

Related U.S. Application Data

(60) Provisional application No. 62/005,260, filed on May 30, 2014, provisional application No. 61/994,459, filed on May 16, 2014.

(51) Int. Cl.
*C09K 9/02* (2006.01)
*G02F 1/15* (2019.01)
(Continued)

(52) U.S. Cl.
CPC .......... *C09K 9/02* (2013.01); *C25B 3/00* (2013.01); *G02F 1/0018* (2013.01); *G02F 1/15* (2013.01);
(Continued)

(58) Field of Classification Search
CPC .... C09K 9/02; C08G 61/126; C08G 2261/54; C08G 2261/44; G02F 1/15; G02C 7/10;
(Continued)

(56) References Cited

U.S. PATENT DOCUMENTS 4,867,541 A * 9/1989 Hotomi ................. G02F 1/1525
359/265
5,066,111 A 11/1991 Singleton et al.
(Continued)

FOREIGN PATENT DOCUMENTS

DE 10036954 2/2002
EP 0577406 A1 5/1994
(Continued)

OTHER PUBLICATIONS

"Device with ionic liquid electrolyte." Electronic Supplementary Material (ESI) for Journal of Materials Chemistry; The Royal Society of Chemistry, 2011. 3 pages.
(Continued)

*Primary Examiner* — Kristina M Deherrera
(74) *Attorney, Agent, or Firm* — Cantor Colburn LLP

(57) ABSTRACT

Disclosed is a method to color tune an electrochromic device by the use of a standard dye. By following the "subtractive color mixing" theory and selecting the appropriate standard dye to compliment or accentuate the electrochromic material, tuning of the optical and colorimetric properties of the resulting electrochromic device can be achieved. The method can also be used to prepare electrochromic devices that will switch between two neutral colors.

26 Claims, 3 Drawing Sheets

(51) Int. Cl.
*G02F 1/00* (2006.01)
*C25B 3/00* (2006.01)
*G02F 1/1516* (2019.01)

(52) U.S. Cl.
CPC .............. *C09K 2211/1458* (2013.01); *C09K 2211/1466* (2013.01); *C09K 2211/1491* (2013.01); *G02F 1/15165* (2019.01); *G02F 2001/164* (2019.01)

(58) Field of Classification Search
CPC . G02C 7/101; G02C 7/102; A61F 9/00–9/029
USPC ........ 359/273, 265; 351/44, 159.39; 257/40; 252/500
See application file for complete search history.

(56) References Cited

U.S. PATENT DOCUMENTS

| | | | |
|---|---|---|---|
| 5,111,327 A | 5/1992 | Blohm et al. | |
| 5,253,100 A | 10/1993 | Yang et al. | |
| 5,377,037 A | 12/1994 | Branz et al. | |
| 5,608,567 A | 3/1997 | Grupp | |
| 5,729,379 A | 3/1998 | Allemand et al. | |
| 6,157,479 A | 12/2000 | Heuer et al. | |
| 6,330,101 B1 | 12/2001 | Yamamoto et al. | |
| 6,368,363 B1 | 4/2002 | Kobatake et al. | |
| 6,433,913 B1 | 8/2002 | Bauer et al. | |
| 6,482,299 B1 | 11/2002 | Inganas et al. | |
| 6,635,729 B1 | 10/2003 | Groenendaal et al. | |
| 6,791,738 B2 | 9/2004 | Reynolds et al. | |
| 6,879,424 B2 * | 4/2005 | Vincent ................ | C09K 9/02 252/586 |
| 6,995,223 B2 | 2/2006 | Groenendaal et al. | |
| 7,321,012 B2 | 1/2008 | Sotzing | |
| 7,411,716 B2 | 8/2008 | Oh et al. | |
| 7,586,663 B1 | 9/2009 | Radmard et al. | |
| 7,626,748 B2 | 12/2009 | Radmard et al. | |
| 7,630,117 B2 | 12/2009 | Oh et al. | |
| 7,737,247 B2 | 6/2010 | Sotzing | |
| 7,808,692 B2 | 10/2010 | Karmhag et al. | |
| 7,874,666 B2 | 1/2011 | Xu et al. | |
| 7,951,902 B2 | 5/2011 | Sotzing | |
| 7,952,785 B2 | 5/2011 | Karmhag et al. | |
| 8,227,567 B2 | 7/2012 | Sotzing | |
| 8,404,515 B2 * | 3/2013 | Sotzing ................ | C25B 3/00 438/99 |
| 8,513,377 B2 | 8/2013 | Sotzing et al. | |
| 8,890,130 B2 | 11/2014 | Sotzing et al. | |
| 9,127,121 B2 | 9/2015 | Sotzing | |
| 9,465,239 B2 * | 10/2016 | Anderson ............... | E06B 9/24 |
| 2002/0149739 A1 | 10/2002 | Perrott et al. | |
| 2002/0171907 A1 | 11/2002 | Vincent et al. | |
| 2003/0087533 A1 | 5/2003 | Stupp et al. | |
| 2003/0232195 A1 | 12/2003 | Reneker et al. | |
| 2004/0072987 A1 | 4/2004 | Groenendaal et al. | |
| 2004/0242792 A1 | 12/2004 | Sotzing | |
| 2005/0157369 A1 | 7/2005 | Xu et al. | |
| 2005/0246888 A1 | 11/2005 | Reynolds et al. | |
| 2006/0047030 A1 | 3/2006 | Yoshida et al. | |
| 2006/0262377 A1 | 11/2006 | Kojima | |
| 2007/0008603 A1 | 1/2007 | Sotzing et al. | |
| 2007/0089845 A1 | 4/2007 | Sotzing et al. | |
| 2008/0291522 A1 | 11/2008 | Varaprasad et al. | |
| 2009/0203873 A1 | 8/2009 | Sotzing | |
| 2010/0245971 A1 | 9/2010 | Sotzing et al. | |
| 2010/0283040 A1 | 11/2010 | Bendikov et al. | |
| 2011/0043886 A1 | 2/2011 | Jeon et al. | |
| 2011/0201826 A1 | 8/2011 | Sotzing | |
| 2011/0233532 A1 | 9/2011 | Sotzing et al. | |
| 2011/0288253 A1 | 11/2011 | Reynolds et al. | |
| 2012/0105933 A1 * | 5/2012 | Hoshino ................ | C09K 9/02 359/266 |
| 2013/0161600 A1 | 6/2013 | Sotzing et al. | |
| 2013/0235323 A1 | 9/2013 | Sotzing et al. | |
| 2015/0232622 A1 | 8/2015 | Sotzing | |
| 2016/0056382 A1 | 2/2016 | Sotzing et al. | |
| 2016/0244553 A1 | 8/2016 | Reynolds et al. | |

FOREIGN PATENT DOCUMENTS

| | | |
|---|---|---|
| EP | 1760110 A1 | 3/2007 |
| EP | 1928000 A1 | 6/2008 |
| EP | 2196847 A1 | 6/2010 |
| EP | 2049944 B1 | 6/2011 |
| EP | 2336255 A1 | 6/2011 |
| JP | 61252535 A | 11/1986 |
| JP | S63128034 A | 5/1988 |
| JP | 63225688 A | 9/1988 |
| JP | 3132724 A | 6/1991 |
| JP | 2007041579 | 2/2007 |
| JP | 2007163865 | 6/2007 |
| KR | 2007007131 | 7/2007 |
| WO | 03046106 A1 | 6/2003 |
| WO | 03054052 A1 | 7/2003 |
| WO | 03054053 A1 | 7/2003 |
| WO | 2004031192 A1 | 4/2004 |
| WO | 2006117800 A2 | 11/2006 |
| WO | 2007008977 A1 | 1/2007 |
| WO | 2007066353 A2 | 6/2007 |
| WO | 2008013499 A1 | 1/2008 |
| WO | 2008118967 A1 | 10/2008 |
| WO | 2009031422 A1 | 3/2009 |
| WO | 2009117025 A1 | 9/2009 |
| WO | 2009124850 A1 | 10/2009 |
| WO | 2011119664 A2 | 9/2011 |
| WO | 2013036789 A1 | 3/2013 |
| WO | 2014018472 A1 | 1/2014 |

OTHER PUBLICATIONS

Agrun, A. "Patterning of Conjugated Polymers for Electrochromic Devices" A Dissertation Presented to the Graduate School of the University of Florida, University of Florida, 2004, 167 pages.

Aubert et al. "Microporous Patterned Electrodes for Color-Matched Electrochromic Polymer Displays" American Chemical Society, 2004, 8 pages.

Beaujuge et al. "The donor-acceptor approach allows a black-to-transmissive switching polymeric electrochrome" Nature Materials, vol. 7, Oct. 2008, 5 pages.

Beaujuge et al., Spray Processable Green to Highly Transmissive Electrochromics via Chemically Polymerizable Donor-Acceptor Heterocyclic Pentamers, Adv. Mater., 2008, 20, 2772-2776.

Bokria et al. "Solid-State Conversion of Processable 3,4-Ethylenedioxythiphene (EDOT) Containing Poly(arylsilane) Precursors to π-Conjugated Conducting Polymers" Advanced Materials 2008, 20, pp. 1775-1778.

Campos et al., "Photovoltaic activity of a PolyProDOT derivative in a bulk heterojunction solar cell", Solar Energy Materials & Solar Cells 90, 2006, pp. 3531-3546.

Coffey et a., "A Facile Synthesis of 3,4-Dialkoxythiophenes", Synthetic Communications, 26(11), 1996, pp. 2205-2212.

D'angelo et al. "Chemical stability of conducting polymers: FriedeleCrafts reactions of alcohols with poly(3,4-ethylenedioxythiophene) (PEDOT)" Polymer 48 (2007) 4328e4336.

Ding et al., "A simple, low waste and versatile procedure to make polymer electrocheromic devices." Journal of Materials Chemistry; 2011, 21, pp. 11873-11878.

Ding; "In situ Polymerization of Conjugated Polymers and All-Organic Electrochromic Fabrics"; University of Connecticut; 2011; 240 pages.

Duluard et al.; "Electrochromic devices based on in situ polymerised EDOT and Prussian Blue: influence of transparent conductin oxide and electrolyte composition-towards up-scalling"; New J. Chem, 2011, 35; pp. 2314-2321.

Galand et al., "Spray Processable Hybrid 3,4-Propylenedioxythionphene: Phenylene Electrochromic Polymers", Macromolecules 39, 2006, pp. 7286-7294.

(56) References Cited

OTHER PUBLICATIONS

Gaupp et al., "Composite Coloration Efficiency Measurements of Electrochromic Polymers Based on 3,4-Alkylenedioxythiophenes", Chem. Mater. 14, 2002, pp. 3694-3970.
Gaupp et al., "Poly(ProDOT-Et2): A High-Contrast, High-Coloration Efficiency Electrochromic Polymer", Macromol. Rapid. Commun. 23, 2002, pp. 885-889.
Heywang et al., "Poly(alkylenedioxythiophene)s—New, Very Stable Conducting Polymers", Advanced Materials, 4(2), 1992, pp. 116-118.
Hwang, J., Tanner, D. B. "Optical properties of nondegenerate ground-state polymers: Three dioxythiophene-based conjugated polymers" The American Physical Society, 2003, 10 pages.
Icli et al. "A new soluble neutral state black electrochromic copolymer via a donor-acceptor appraoch" Organic Electronics 11 (2010) 1255-1260.
Invernale et al. "Variable-color poly(3,4-propylenedioxythiophene) electrochromics from precursor polymers" Published by Elsevier Ltd., Polymer 51 (2010) 378-382, available online Dec. 21, 2009.
Invernale et al., "Polythieno[3,4-b]thiophene as an Optically Transparent Ion-Storage Layer", Chemistry of Materials, 21, 2009, pp. 3332-3336.
Krishnamoorthy et al.; "Rational design of an electrochromic polymer with high contrast in the visible region: dibenzyl substituted poly (3,4-propylenedioxythiophehe)"; Journal of Chemistry; 2001; pp. 2909-2911.
Kumar Anil et al.; "Conducting Poly(3-4-alkylenedioxythiophene) Derivatives as Fast Electrochromics with High-Contrast Ratios"; Chem Mater.; 1998, 10, pp. 896-902.
Lee, K. Sotzing, G. "New Method to Prepare Conjugated Polymers; Polyarylsiloxane as Precursors to Conjugated Polymers" Polymeric Materials: Science & Engineering 2010, 103, 128, 3 pages.
Lee, K. Sotzing, G. "Preparation of Conjugated Polymers from Polyarylsiloxnae Precursors" Abstract #1307, 219th ECS Meeting, © 2011 The Electrochemical Society, 2 pages.
Li, et al., "Nanofibers of Conjugated Polymers Prepared by Electrospinning With a Two-Capillary Spinneret", Adv. Mater. Nov. 18, 2004, 16, No. 22, pp. 2062-2066.
Ozkut et al., "A blue to highly transmissive soluble electrochromic polymer based on poly (3,4-propylenedioxyselenophene) with a high stability and coloration efficiency", Journal of Materials Chemsitry, 21, 2011, pp. 5268-5272.
Padilla et al., "Electrochemical study of dual conjugated polymer electrochromic devices", Journal of Electroanalytical Chemistry 609, 2007, pp. 75-84.
Padilla et al., "High contrast solid-state electrochromic devices frmo substituted 3,4-propylenedioxythiophenes using the dual conjugated polymer approach", Synthetic Metals 157, 2007, pp. 261-268.
Reeves et al., "Dual Cathodically and Anodically Coloring Electrochromic Polymer Based on a Spiro Bipropylenedioxythionphene [(Poly(spiroBiProDOT)]", Advanced Materials, 14(10), 2002, pp. 717-719.
Sapp et al., "High Contrast Ratio and Fast-Switching Dual polymer Electrochromic Devices", Chem. Mater. 10, 1998, pp. 2101-2108.
Sapp et al., "Rapid Switching Solid State Electrochromic Devices Based on Complementary Conducting Polymer Films**", Adv. Material, 8, No. 10, pp. 808-811.
Seshadri et al., "Optimization, preparation, and electrical short evaluation for 30 cm2 active area dual conjugated polymer electrochromic windows", Organic Eelctronics 8, 2007, pp. 367-381.
Sotzing webpage "Electrochromic Devices"; Institute of Materials Sciences; University of Connecticut; downloaded from http://www.ims.uconn.edu/~sotzing_grp/research/ECDevices.html; on May 31, 2011; 2 pages.
Sotzing, et al, "Oxidative Sold-State Crosslinking of Polymer Precursors to Pattern Intrinsically Conducting Polymers", Polymeric Materials: Science & Engineering 2002, 87, 371-87, 372.
Sotzing, et al., "Electrochromic Spandex and Other Fabrics for Adaptive Camouflage", MRS Apr. 2011.
Thompson et al., "Soluble Narrow Band Gap and Blue Propylenedioxythiophene-Cyanovinylene Polymers as Multifunctional Materials for Photovoltaic and Electrochromic Applications", J. Am. Chem. Soc. 128, 2006, pp. 12714-12725.
U.S. Appl. No. 10/978,834, filed Nov. 1, 2004; 28 pages.
Walczak et al., "Easily Oxidized high Band Gap Conjugated Polymers", Polymer Preprints 45(1), 2004, p. 229.
Welsh Dean M. et al.; "Enhanced Contrast Ratios and Rapid Wwitching in Electrochromics Based on Poly(3,4-propylemedioxythiophene) Derivatives"; Advanced Materials; 1999, II, No. 16; pp. 1379-1382.
Welsh et al., "Fast Electrochromic Polymers Based on New Poly(3,4-alkylenedioxythiophene) Derivatives", Synthetic Metals, 102, 1999, pp. 967-968.
Zhu et al. 2014, "Neutral color tuning of polymer electrochromic devices using an organic dye"; ChemCommun., May 19, 2014, 50, 8167; 4 pages.
Zong et al., 3,4-Alkylenedioxy ring formation via double Mitsunobu reactions: an efficient route for the synthesis of 3,4-ethylenedioxythiophene (EDOT) and 3,4-propylenedioxythiophene (ProDOT) derivatives as monomers for electron-rich conducting polymer.
Invernale et al., "Preparation of Conjugated Polymers Inside Assembled Solid-State Devices", Advanced Materials 22, 2010, pp. 1379-1382.

* cited by examiner (a)

(b)

COLOR TUNING OF ELECTROCHROMIC DEVICES USING AN ORGANIC DYE

CROSS-REFERENCE TO RELATED APPLICATIONS

This application claims the benefit of U.S. Provisional Application Ser. No. 61/994,459, filed May 16, 2014 and 62/005,260 filed May 30, 2014, both of which are incorporated herein by reference in their entirety.

BACKGROUND

The color switching accompanied with external bias is defined as electrochromism, where the external bias triggers either a change of molecular stack or electron transfer (redox process). Electrochromic materials that exhibit the necessary colors for RGB and CMYK color replication have been sought after by the display industry for the fabrication of lower-power, thinner, flexible, and less complex displays. Among the numerous types of electrochromic materials, conjugated polymers exhibit high optical contrasts, fast switching speeds, and the multitude of colors achievable through chemical structure modifications. Further, a conjugated polymer, which changes its color by a redox process, has high optical contrast ratio, rapid redox switching, and long-term stability, is a desired material for various electrochromic device applications.

Various colors of the conjugated polymer at the neutral state have been shown, including colors such as blue, green, yellow, and red. However, in some electrochromic device applications, neutral color transitions are desired. A neutral color is a color not associated with any single hue. Some common neutral colors include beige, ivory, grey, taupe, black, and white.

There remains a need in the art for a convenient method for tuning the optical properties of electrochromic devices prepared from conjugated polymers beyond structural modification of the conjugated polymer.

BRIEF SUMMARY

In an embodiment, an electrochromic device comprises an electrochromic material and a standard dye disposed between at least two electrodes, or an electrochromic material disposed between at least two electrodes and a standard dye external to the at least two electrodes, wherein the standard dye does not undergo redox (reduction or oxidation) processes within the potential window for operation of the electrochromic device, does not react with the electrochromic material, and optionally appropriately compliments or accentuates the electrochromic material in the bleached state, the colored state, or both.

In an embodiment, a method of color tuning an electrochromic device comprises selecting an electrochromic material; selecting a standard dye that appropriately compliments or accentuates the electrochromic material in the bleached state, the colored state, or both; and forming an electrochromic device comprising a combination of the electrochromic material and the standard dye disposed between at least two electrodes; wherein the standard dye does not undergo redox (reduction or oxidation) processes within the potential window for operation of the electrochromic device, does not react with the electrochromic material, and optionally appropriately compliments or accentuates the electrochromic material in the bleached state, the colored state, or both.

In an embodiment, a method of forming a solid-state electrochromic device comprises
applying voltage to a device comprising
at least two electrodes,
a combination of a crosslinked gel electrolyte composition, an electroactive monomer,
and a standard dye, the combination disposed between the at least two electrodes, and
a potential source in electrical connection with the at least two electrodes;
wherein the applying voltage polymerizes the electroactive monomer to form a composite comprising conjugated polymer, standard dye, and crosslinked gel electrolyte composition;
wherein the standard dye
is soluble in a gel electrolyte precursor solvent used to prepare the crosslinked gel electrolyte composition,
does not undergo redox (reduction or oxidation) processes within the potential window for operation of the electrochromic device,
does not react with the conjugated polymer when oxidized or reduced (or neutral), and optionally appropriately compliments or accentuates the conjugated polymer in the bleached state, the colored state, or both.

In an embodiment, a solid-state electrochromic device comprises
at least two electrodes; and
a composite disposed between the at least two electrodes, the composite comprising a conjugated polymer, a standard dye, and a crosslinked gel electrolyte composition;
wherein the composite is formed by in situ polymerization of an electroactive monomer in a combination comprising the crosslinked gel electrolyte composition, the standard dye, and the electroactive monomer, wherein the conjugated polymer is not formed as a discrete film; and
wherein the standard dye
is soluble in a gel electrolyte precursor solvent used to prepare the crosslinked gel electrolyte composition,
does not undergo redox (reduction or oxidation) processes within the potential window for operation of the electrochromic device,
does not react with the conjugated polymer when oxidized or reduced (or neutral), and
optionally appropriately compliments or accentuates the conjugated polymer in the bleached state, the colored state, or both.

DETAILED DESCRIPTION

Figure 1:
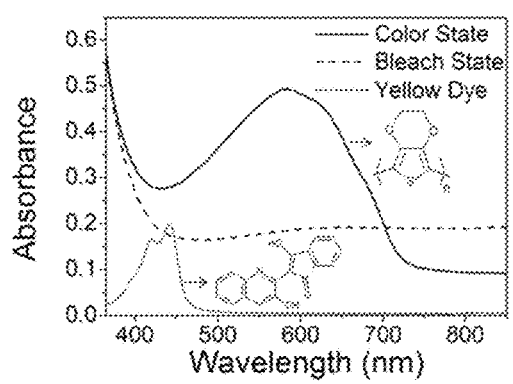
FIG. 1(a) UV-Vis absorption spectra of in situ PEDOT device, and a yellow dye (background corrected).
FIG. 1(b) UV-Vis absorption spectra of in situ PEDOT+ yellow dye device.
Figure 1:
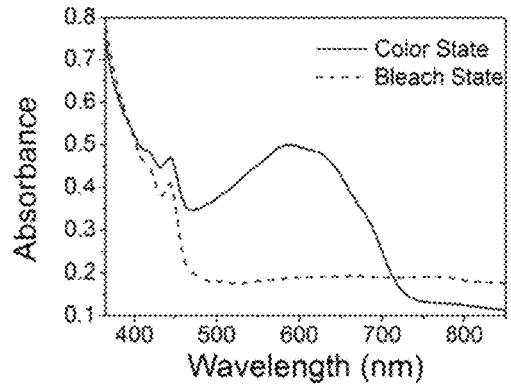

Disclosed herein is a method to color tune an electrochromic device prepared from a conjugated polymer or other electrochromic material by the use of a standard dye, for example a solvent dye or a small molecule organic dye. The method is convenient, simple, efficient, and cost-effective. The method can also be used to prepare electrochromic devices that will switch between two neutral colors.

In an embodiment, an electrochromic device comprises an electrochromic material in contact with a standard dye where the standard dye does not undergo redox (reduction or oxidation) processes within the potential window for operation of the electrochromic device, does not react with the electrochromic material, and optionally appropriately compliments or accentuates the electrochromic material in the bleached state, the colored state, or both. In a specific embodiment, both the electrochromic material and the standard dye are disposed between at least two electrodes. The electrochromic material can be an electrodeposited conjugated polymer, a solvent cast conjugated polymer, an in situ formed conjugated polymer, an inorganic electrochromic material, a viologen based electrochromic material, or an oligomeric electrochromic material. The device can be a solid state electrochromic device or a liquid state electrochromic device.

In an embodiment, the electrochromic device can be prepared by placing a standard dye and an electrochromic material or electrochromic material precursor (a material that can be converted to an electrochromic material e.g. electroactive monomer) disposed between at least two electrodes to form the electrochromic device. An alternative embodiment is to have the standard dye external to the electrodes.

In an embodiment, a method of color tuning an electronic device comprises selecting an electrochromic material; selecting a standard dye that appropriately compliments or accentuates the electrochromic material in the bleached state, the colored state, or both; and forming an electrochromic device comprising a combination of the electrochromic material and the standard dye disposed between at least two electrodes. An alternative embodiment is to have the standard dye external to the electrodes.

In an embodiment, the method generally involves the in situ electrochemical polymerization of electroactive monomers in the presence of a standard dye and a gel polymer electrolyte composition comprising an organic solvent or plasticizer the standard dye is soluble in. A description of the in situ electrochemical polymerization of electroactive monomers in the presence of a gel polymer electrolyte can be found in U.S. Pat. No. 8,404,515 to Sotzing et al. which is fully incorporated herein by reference in its entirety.

The instant method achieves the desired color transitions, not by synthesizing electrochromic polymer (i.e. structural modification), but by following the "subtractive color mixing" theory. For example, red can be made by blending green and blue absorbing materials, leaving only red light transmission or reflection. By adding an appropriate standard dye to the electroactive monomer gel polymer electrolyte, the ability to tune optical and colorimetric properties of the resulting electrochromic device can be achieved.

In an exemplary embodiment to achieve color neutrality using an in situ process, in situ polymerizing the electroactive monomer ethylenedioxythiophene (EDOT) in the presence of the yellow solvent dye 2-(3-hydroxy-1H-quinolin-2-ylidene)indene-1,3-dione (C.I. Solvent Yellow 114, CAS #17772-51-9) results in an electrochromic device that exhibits color neutrality. Although the yellow solvent dye is conjugated, it does not disrupt the electropolymerization of EDOT, nor does it affect the redox process of the poly(3,4-ethylenedioxythiophene) (PEDOT) responsible for its electrochromic functionality.

In order to achieve neutrality, an electrochromic device should exhibit absorption of light across all or near all wavelengths of the visible spectrum. An approach to solving this requirement is to use a conjugated polymer that has broad visible absorption and combine it with a standard dye of a complimentary color, such that most of the visible region can is absorbed, which, will in turn result in a neutral color. PEDOT is an example of such a conjugated polymer as its absorption in the neutral state spans from 500 nm to 700 nm with a maximum absorption peak at ca. 610 nm, giving it a deep blue color. In the oxidized state, PEDOT exhibits a transmissive sky blue color.

C.I. Solvent Yellow 114 dye can be combined with the PEDOT due to its absorption in and around the 450 nm region which complements the absorption of PEDOT. The spectral overlap with the PEDOT conjugated polymer is complimentary resulting in a 'neutral' coloration in both the bleached and colored states. In addition, this yellow dye allows for both the bleached and colored states to stay within eyewear neutral chromaticity specifications. Other advantages of the yellow dye are that it does not undergo reduction or oxidation in the range of −3V to 3V in the electrolytic medium, and is soluble in the electrolyte precursor solution.

In an embodiment, an in situ method of forming a solid-state electrochromic device comprises applying voltage to a device comprising at least two electrodes, a combination of a crosslinked gel electrolyte composition, an electroactive monomer, and a standard dye, the combination disposed between the at least two electrodes, and a potential source in electrical connection with the at least two electrodes; wherein the applying voltage polymerizes the electroactive monomer to form a composite comprising conjugated polymer, standard dye, and crosslinked gel electrolyte composition. The method can further comprise tuning the electrochromic device to a neutral color transition by determining molar absorptivity of the standard dye in the gel electrolyte precursor solvent; determining molar absorptivity of the conjugated polymer; and selecting a concentration of the standard dye in the gel electrolyte precursor solvent that balances the standard dye's absorbance intensity with the conjugated polymer's absorbance intensity.

Many of the standard dyes that can be used in the methods and devices herein are commercially available from a number of suppliers and include the so-called solvent dyes. "Solvent dye" means a dye that is soluble in organic solvents such as propylene carbonate or any one of the solvents disclosed herein for use to prepare the gel electrolyte precursor mixture. The particular selection of standard dye for use in the in situ method includes a standard dye that is soluble in an organic solvent where the organic solvent is one that can be used as an electrolytic medium. The exemplary standard dye is one that does not undergo any redox (reduction or oxidation) processes within the potential window for operation of the electrochromic polymer or electrochromic material. Further, the electrochromic polymer or other electrochromic material, when oxidized or reduced (or neutral) must not chemically react with the standard dye. Additionally, the standard dye can be chosen to appropriately compliment or accentuate the electrochromic material whether it be the bleached or colored state or both.

Exemplary standard dyes that can be used include quinoline dyes (e.g. Solvent yellow 114), azo dyes (including monoazo, diazo, triazo, and polyazo dyes), anthraquinone dyes, nitroso dyes, nitro dyes, azoic dyes, stilbene dyes, carotenoid dyes, diphenylmethane dyes, triarylmethane dyes, xanthene dyes, acridene dyes, quinoline dyes, methine dyes, indamine/indophenol dyes, azine dyes, oxazine dyes, thiazine dyes, sulphur dyes, lactone dyes, aminoketone dyes, hydroxykentone dyes, indigoid dyes, phthalocyanine dyes, and other dyes that meet the requirement of organic solvent solubility, redox properties, and chemical reactivity discussed in the previous paragraph. Exemplary standard dyes include the solvent dyes listed in the table below.

| C.I. Generic name | C.I. NO. |
| --- | --- |
| Solvent Black 27 | — |
| Solvent Black 29 | — |
| Solvent Black 45 | — |
| Solvent blue 104 | 61568 |
| Solvent blue 122 | 60744 |
| Solvent blue 35 | 61554 |
| Solvent blue 36 | 51551 |
| Solvent Blue 4 | 45045:1 |
| Solvent blue 59 | 61552 |
| Solvent blue 78 | 61500 |
| Solvent blue 97 | 615290 |
| Solvent Brown 1 | 11285 |
| Solvent Brown 2 | 11330 |
| Solvent Brown 3 | 11360 |
| Solvent Brown 4 | 12000 |
| Solvent Brown 5 | 12020 |
| Solvent green 28 | 625580 |
| Solvent Green 3 | 61565 |
| Solvent green 5 | 59075 |
| Solvent Green 7 | 59040 |
| Solvent orange 107 | — |
| Solvent Orange 3 | 11270B; 11270:1 |
| Solvent orange 60 | 564100 |
| Solvent Orange 62 | — |
| Solvent orange 63 | 68550 |
| Solvent Orange 7 | 12140 |
| Solvent Orange 99 | — |
| Solvent Red 1 | 12150 |
| Solvent Red 111 | 60505 |
| Solvent Red 122 | — |
| Solvent Red 132 | — |
| Solvent red 135 | 564120 |
| Solvent red 149 | 674700 |
| Solvent Red 168 | — |
| Solvent red 179 | 564150 |
| Solvent red 196 | 505700 |
| Solvent red 197 | 505720 |
| Solvent red 207 | 617001 |
| Solvent Red 23 | 26100 |
| Solvent Red 24 | 26105 |
| Solvent red 242 | 73300 |
| Solvent red 27 | 26125 |
| Solvent Red 4 | 12170 |
| Solvent Red 49 | 45170B; 45170:1 |
| Solvent Red 52 | 68210 |
| Solvent Red 8 | 12715 |
| Solvent Red 91 | — |
| Solvent violet 13 | 60725 |
| Solvent Violet 14 | 61705 |
| Solvent violet 31 | 61102 |
| Solvent violet 36 | — |
| Solvent Violet 58 | — |
| Solvent violet 59 | 62025 |
| Solvent Violet 8 | CI No 42535:1 |
| Solvent Violet 9 | CI No 42555:1 |
| Solvent Yellow 1 | 11000 |
| Solvent yellow 114 | 47020 |
| Solvent Yellow 14 | 12055 |
| Solvent Yellow 16 | 12700 |
| Solvent yellow 163 | 58840 |
| Solvent yellow 176 | 47023 |
| Solvent Yellow 18 | 12740 |
| Solvent Yellow 2 | 11020 |
| Solvent Yellow 21 | 18690 |
| Solvent Yellow 3 | 11160 |
| Solvent Yellow 33 | 47000 |
| Solvent Yellow 34 | 41000:1 |
| Solvent Yellow 56 | 11021 |
| Solvent Yellow 62 | — |
| Solvent Yellow 7 | 11800 |
| Solvent Yellow 72 | — |
| Solvent Yellow 82 | — |
| Solvent Yellow 93 | 48160 |
| Solvent yellow 98 | 56238 |

The standard dye, as used herein, excludes viologens.

The standard dye can be used in an amount of about 1 to about 50% by weight based on the combined weight of the standard dye and electrochromic material, specifically about 5 to about 40% by weight, and more specifically about 10 to about 30% by weight.

A suitable standard dye can be determined using techniques known to one having ordinary skill in the art without the need for undue experimentation. For example, to determine if any specific dye would undergo any redox (reduction or oxidation) processes within the potential window for operation of the electrochromic material, the dye would be prepared with the components of the electrochromic device, such as solvent, salt, etc. but in the absence of the electrochromic material, to form a "blank" device. The blank device would then be tested within the voltage window that will be used for the electrochromic device to determine if the dye changes color or is otherwise unaffected. If the dye does not undergo any redox processes within the potential window for operation, then a full device including the electrochromic material can be prepared and tested to determine if there is any reactivity between the standard dye and the electrochromic material.

When in situ polymerization is used, the application of a voltage causes diffusive migration of the electroactive monomer present to the working electrode and the subsequent formation of the conjugated polymer in and around the crosslinked matrix of the gel electrolyte to form a composite further comprising the standard dye. In another embodiment, a gel electrolyte precursor is used and the voltage is applied to form the conjugated polymer prior to the crosslinking of the gel electrolyte precursor to gel electrolyte. In another embodiment, the polymerization of the electroactive monomer and the crosslinking of the gel electrolyte precursor are performed at the same time.

The electrolyte compositions for use in the solid-state device include those known for use in electrochromic devices. The electrolyte composition may include metal salts, organic salts (e.g., ionic liquids), inorganic salts, and the like, and a combination thereof.

In one embodiment the electrolyte composition is a gel electrolyte, specifically a crosslinked gel electrolyte. The gel electrolyte can be prepared from a gel electrolyte precursor mixture comprising a gel electrolyte precursor and a solvent. The gel electrolyte precursor can be monomeric or polymeric. In particular, the gel precursor is a crosslinkable polymer. The crosslinkable polymer can comprise polymerizable end groups, polymerizable side-chain groups, or a combination thereof attached to a polymer backbone. Exemplary polymer backbones include polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof. More specifically, the gel precursor is a cross-linkable polyether. Exemplary polyethers include poly(alkylene ethers) and poly(alkylene glycol)s comprising ethyleneoxy, propyleneoxy, and butyleneoxy repeating units. Hydroxyl end groups of poly(alkylene glycols) can be capped with polymerizable vinyl groups including (meth)acrylate and styryl vinyl groups to form a crosslinkable polyether. In particular, the crosslinkable polymer is selected from the group consisting of poly(ethylene glycol)methyl ether acrylate (PEG-MA), poly(ethylene glycol) diacrylate (PEG-DA), poly(propylene glycol) diacrylate (PPG-DA), poly(butylene glycol) diacrylate (PBG-DA), poly(ethylene oxide) (PEO), poly(propylene oxide) (PPO), poly(butylene oxide) (PBO), and combinations thereof. The crosslinkable polymer can also be a copolymer or a block copolymer comprising ethyleneoxy, propylenoxy, or butyleneoxy repeating units. In one embodiment, the gel precursor is PEG-MA. In one embodiment, the gel precursor is PEO and is crosslinked thermally. In one embodiment, the gel precursor is PEO and is crosslinked using UV radiation. In one embodiment, the gel precursor is crosslinkable polymer comprising a mixture of PEG-DA and PEO, wherein the PEO:PEG-DA weight ratio is from 95:5 to 5:95, more specifically 90:10 to 10:90, and even more specifically 60:40 to 40:60 or 50:50.

The electrolyte composition can comprise an alkali metal ion of Li, Na, or K. Exemplary electrolytes, where M represents an alkali metal ion, include $MClO_4$, $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)_2$, $MN(C_2F_5SO_2)_2$, $MC(CF_3SO_2)_3$, $MC_nF_{2n+1}SO_3$ ($2 \leq n \leq 3$), $MN(RfOSO_2)_2$ (wherein Rf is a fluoroalkyl group), MOH, or combinations of the foregoing electrolytes. In particular, the electrolyte composition comprises a lithium salt. More particularly, the lithium salt is lithium trifluoromethanesulfonate. Other suitable salts include tetra-n-butylammonium tetrafluoroborate ($TBABF_4$); tetra-n-butylammonium hexafluorophosphate ($TBAPF_6$); and combinations thereof. When a gel electrolyte is used, the concentration of the electrolyte salt may be about 0.01 to about 30% by weight of the gel electrolyte precursor, specifically about 5 to about 20% by weight, and yet more specifically about 10 to about 15% by weight of the gel electrolyte precursor.

The gel electrolyte precursor mixture can also comprise a solvent or plasticizer to enhance the ionic conductivity of the electrolyte. These may be high boiling organic liquids such as carbonates, their blends or other materials like dimethylformamide (DMF). In particular the solvent can be a carbonate, for example alkylene and alkylyne carbonates such as dimethyl carbonate, ethylmethyl carbonate, methylpropyl carbonate, methylbutyl carbonate, methylpentyl carbonate, diethyl carbonate, ethylpropyl carbonate, ethylbutyl carbonate, dipropyl carbonate, propylene carbonate, ethylene carbonate, propylyne carbonate, and combinations thereof. The amount of solvent added to the gel electrolyte precursor mixture can range from about 1 to about 50% by weight of the gel electrolyte precursor mixture, specifically about 10 to about 40% by weight, and more specifically about 20 to about 30% by weight of the gel electrolyte precursor mixture.

The gel electrolyte precursor mixture can further comprise other additives such as photochemical sensitizers, free radical initiators, and diluent polymers, providing the desired properties of the electrochromic device are not significantly adversely affected; for example, the ionic conductivity of the gel electrolyte, the switching speed of the electrochromic response, color contrast of the electrochromic response, adhesion of the gel electrolyte to the substrate, and flexibility of the electrodes.

The electrolyte composition may contain an ionic liquid. Ionic liquids are organic salts with melting points under about 100° C. Other ionic liquids have melting points of less than room temperature (~22° C.). Examples of ionic liquids that may be used in the electrolyte composition include imidazolium, pyridinium, phosphonium or tetralkylammonium based compounds, for example, 1-ethyl-3-methylimidazolium tosylate, 1-butyl-3-methylimidazolium octyl sulfate; 1-butyl-3-methylimidazolium 2-(2-methoxyethoxyl) ethyl sulfate; 1-ethyl-3-methylimidazolium bis(pentafluoroethylsulfonyl)imide; 1-ethyl-3-methylimidazolium bis(trifluoromethylsulfonyl)imide; 1-ethyl-3-methylimidazolium bromide; 1-ethyl-3-methylimidazolium hexafluorophosphate; 1-butyl-3-methylimidazolium bromide; 1-butyl-3-methylimidazolium trifluoromethane sulfonate; 1,2-dimethyl-3-propylimidazolium tris(trifluoromethylsulfonyl)methide; 1,2-dimethyl-3-propylimidazolium bis(trifluoromethylsulfonyl)imide; 3-methyl-1-propylpyridinium bis(trifluormethylsulfonyl)imide; 1-butyl-3-methylpyridinium bis(trifluormethylsulfonyl)imide; 1-butyl-4-methylpyridinium chloride; 1-butyl-4-methylpyridinium hexafluorophosphate; 1-butyl-4-methylpyridinium tetrafluoroborate; 1-n-butyl-3-methylimidazolium hexafluorophosphate (n-BMIM $PF_6$); 1-butyl-3-methylimidazolium tetrafluoroborate (BMIM $BF_4$); phosphonium dodecylbenzenesulfonate; phosphonium methanesulfonate; and mixtures of these.

The amount of ionic liquid that can be used in the gel electrolyte precursor mixture can range from about 10% to about 80% by weight, specifically about 20% to about 70% by weight, more specifically about 30% to about 60% by weight, and yet more specifically about 40% to about 50% by weight of the gel electrolyte precursor mixture.

The gel electrolyte precursor can be converted to a gel via radical crosslinking initiated by thermal methods, or in particular by exposure to ultraviolet (UV) radiation. In an exemplary embodiment, the wavelength of UV irradiation is about 365 nm although other wavelengths can be used.

The gel electrolyte precursor mixture may comprise a thermal initiator or a photoinitiator. Exemplary photoinitiators include benzophenone, 2,2-dimethoxy-2-phenylacetophenone (DMPAP), dimethoxyacetophenone, xanthone, and thioxanthone. In one embodiment the initiator may include 2,2-dimethoxy-2-phenyl-acetophenone (DMPAP).

Crosslinking may also be thermally induced at about 40° C. to about 70° C., specifically about 50° C. using a thermal initiator. Exemplary thermal initiators include peroxide initiators such as benzyl peroxide (BPO), or azo bis isobutylnitrile (AIBN).

In one embodiment, the gel electrolyte precursor mixture comprises the electrolyte salt (e.g. metal salts, organic salts (e.g., ionic liquids), inorganic salts, or a combination thereof) and the gel precursor in a weight ratio of 1 to 10, with a 0.002 to 1 to 10 ratio of initiator to electrolyte to gel precursor, by weight.

Exemplary gel polymer electrolytes include those described in U.S. Pat. No. 7,586,663 and U.S. Pat. No. 7,626,748, both to Radmard et al., both incorporated herein by reference in their entirety.

The electroactive monomer is polymerized in situ in the assembled device by applying voltage (oxidative potential) across the device. The electroactive monomer irreversibly converts to the conjugated polymer and can be switched as normal, with a moderate reduction in optical contrast.

Examples of suitable electroactive monomers include those known in the art to exhibit electroactivity when polymerized, including but not limited to thiophene, substituted thiophene, carbazole, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b]furan, bithiophene, substituted bithiophene, pyrrole, substituted pyrrole, acetylene, phenylene, substituted phenylene, naphthalene, substituted naphthalene, biphenyl and terphenyl and their substituted versions, phenylene vinylene (e.g., p-phenylene vinylene), substituted phenylene vinylene, aniline, substituted aniline, indole, substituted indole, the monomers disclosed herein as structures (I)-(XXXI), combinations thereof, and the like. These electroactive monomers can be used for the in situ method, the method of electrodepositing a conjugated polymer, or polymerized and used to prepare a solvent cast conjugated polymer.

The electroactive monomer can be selected from cathodically coloring materials, anodically coloring materials, or a combination thereof.

Cathodically coloring materials have a band gap ($E_g$) less than or equal to 2.0 eV in the neutral state. A cathodically coloring material changes color when oxidized (p-doped). The change in visible color can be from colored in the neutral state to colorless in the oxidized state, or from one color in the neutral state to a different color in the oxidized state. Cathodically coloring materials include, but are not limited to, polymers derived from a 3,4-alkylenedioxyheterocycle such as an alkylenedioxypyrrole, alkylenedioxythiophene or alkylenedioxyfuran. These further include polymers derived from 3,4-alkylenedioxyheterocycles comprising a bridge-alkyl substituted 3,4-alkylenedioxythiophene, such as 3,4-(2,2-dimethylpropylene)dioxythiophene (ProDOT-(Me)$_2$), 3,4-(2,2-dihexylpropylene)dioxythiophene (ProDOT-(hexyl)$_2$), or 3,4-(2,2-bis(2-ethylhexyl)propylene)dioxythiophene (ProDOT-(ethylhexyl)$_2$). Herein, "colored" means the material absorbs one or more radiation wavelengths in the visible region (400 nm to 700 nm) in sufficient quantity that the reflected or transmitted visible light by the material is visually detectable to the human eye as a color (red, green, blue or a combination thereof).

An anodically coloring material has a band gap $E_g$ greater than 3.0 eV in its neutral state. An anodically coloring material changes color when reduced (n-doped). The material can be colored in the neutral state and colorless in reduced state, or have one color in the neutral state and a different color in the reduced state. An anodically coloring material can also comprise polymers derived from a 3,4-alkylenedioxyheterocycle or derived from an alkylenedioxyheterocycle such as alkylenedioxypyrrole, alkylenedioxythiophene or alkylenedioxyfuran. Exemplary 3,4-alkylenedioxyheterocycle monomers to prepare anodically coloring polymers include an N-alkyl substituted 3,4-alkylenedioxypyrrole, such as N-propyl-3,4-propylenedioxypyrrole (N—Pr ProDOP), N-Gly-3,4-propylenedioxypyrrole (N-Gly ProDOP), where N-Gly designates a glycinamide adduct of pyrrole group, or N-propane sulfonated ProDOP (ProDOP-NPrS).

In one embodiment EDOT is used to prepare a cathodically coloring conjugated polymer and 3,6-bis(2-(3,4-ethylenedioxyl)thienyl)-N-methylcarbazole (BEDOT-NMCz) is used to prepare an anodically coloring conjugated polymer which is complementary to PEDOT when on the counter electrode.

Suitable electroactive monomers include 3,4-ethylenedioxythiophene, 3,4-ethylenedithiathiophene, 3,4-ethylenedioxypyrrole, 3,4-ethylenedithiapyrrole, 3,4-ethylenedioxyfuran, 3,4-ethylenedithiafuran, and derivatives having the general structure (I):

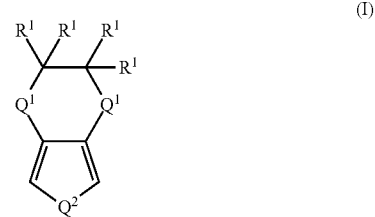

wherein each occurrence of $Q^1$ is independently S, O, or Se; $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $R^1$ is hydrogen. In one embodiment, each $Q^1$ is O and $Q^2$ is S. In another embodiment, each $Q^1$ is O, $Q^2$ is S, and one $R^1$ is $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, —$C_1$-$C_6$ alkyl-O—$C_1$-$C_6$ alkyl, while the remaining $R^1$ are hydrogen. In another embodiment, each $Q^1$ is O, $Q^2$ is S, and one $R^1$ is $C_1$ alkyl-OH, while the remaining $R^1$ are hydrogen. A specific electroactive monomer is 3,4-ethylenedioxythiophene or EDOT.

Another suitable electroactive monomer includes an unsubstituted and 2- or 6-substituted thieno[3,4-b]thiophene and thieno[3,4-b]furan having the general structures (II), (III), and (IV):

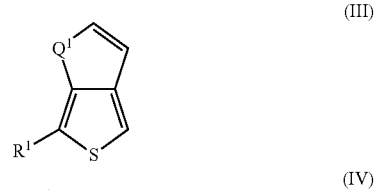

wherein $Q^1$ is S, O, or Se; and $R^1$ is hydrogen, $C_1$-$C_{12}$ alkyl, $C_1$-$C_{12}$ haloalkyl including perfluoroalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, $Q^1$ is S and $R^1$ is hydrogen. In another embodiment, $Q^1$ is O and $R^1$ is hydrogen. In yet another embodiment, $Q^1$ is Se and $R^1$ is hydrogen.

Another suitable electroactive monomer includes substituted 3,4-propylenedioxythiophene (ProDOT) monomers according to the general structure (V):

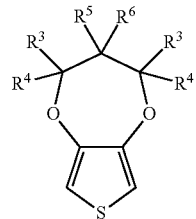
(V)

wherein each instance of $R^3$, $R^4$, $R^5$, and $R^6$ independently is hydrogen; optionally substituted $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, —$C_1$-$C_{10}$ alkyl-aryl; or hydroxyl. The $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, or —$C_1$-$C_{10}$ alkyl-aryl groups each may be optionally substituted with one or more of $C_1$-$C_{20}$ alkyl; aryl; halogen; hydroxyl; —N—$(R^2)_2$ wherein each $R^2$ is independently hydrogen or $C_1$-$C_6$ alkyl; cyano; nitro; —COOH; —S(=O) $C_0$-$C_{10}$ alkyl; or —S(=O)$_2C_0$-$C_{10}$ alkyl. In one embodiment, $R^5$ and $R^6$ are both hydrogen. In another embodiment, $R^5$ and $R^6$ are both hydrogen, each instance of $R^3$ independently is $C_1$-$C_{10}$ alkyl or benzyl, and each instance of $R^4$ independently is hydrogen, $C_1$-$C_{10}$ alkyl, or benzyl. In another embodiment, $R^5$ and $R^6$ are both hydrogen, each instance of $R^3$ independently is $C_1$-$C_5$ alkyl or benzyl and each instance of $R^4$ independently is hydrogen, $C_1$-$C_5$ alkyl, or benzyl. In yet another embodiment, each instance of $R^3$ and $R^4$ are hydrogen, and one of $R^5$ and $R^6$ is hydroxyl while the other is hydrogen.

Other suitable electroactive monomers include pyrrole, furan, thiophene, and derivatives having the general structure (VI):

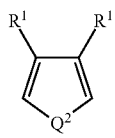
(VI)

wherein $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. An exemplary substituted pyrrole includes n-methylpyrrole. Exemplary substituted thiophenes include 3-methylthiophene and 3-hexylthiophene.

Additional electroactive monomers include isathianaphthene, pyridothiophene, pyrizinothiophene, and derivatives having the general structure (VII):

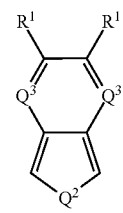
(VII)

wherein $Q^2$ is S, O, or N—$R^2$ wherein $R^2$ is hydrogen or $C_1$-$C_6$ alkyl; each occurrence of $Q^3$ is independently CH or N; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Still other electroactive monomers include oxazole, thiazole, and derivatives having the general structure (VIII):

(VIII)

wherein $Q^1$ is S or O.

Additional electroactive monomers include the class of compounds according to structure (IX):

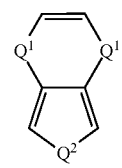
(IX)

wherein $Q^2$ is S, O, or N—$R^2$ wherein $R^2$ is hydrogen or $C_1$-$C_6$ alkyl; and each occurrence of $Q^1$ is independently S or O.

Additional electroactive monomers (or oligomers) include bithiophene, bifuran, bipyrrole, and derivatives having the following general structure (X):

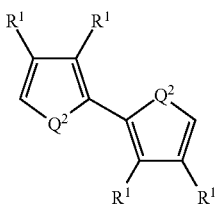
(X)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Electroactive monomers (or oligomers) include terthiophene, terfuran, terpyrrole, and derivatives having the following general structure (XI):

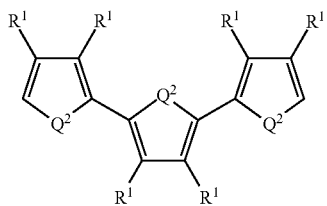
(XI)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional electroactive monomers include thienothiophene, thienofuran, thienopyrrole, furanylpyrrole, furanylfuran, pyrolylpyrrole, and derivatives having the following general structure (XII):

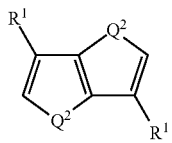
(XII)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Still other electroactive monomers include dithienothiophene, difuranylthiophene, dipyrrolylthiophene, dithienofuran, dipyrrolylfuran, dipyrrolylpyrrole, and derivatives having the following general structure (XIII):

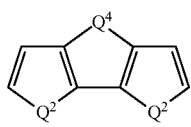
(XIII)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional electro active monomers include dithienylcyclopentenone, difuranylcyclopentenone, dipyrrolylcyclopentenone and derivatives having the following general structure (XIV):

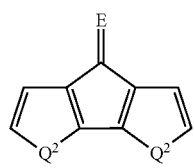
(XIV)

wherein each occurrence of $Q^2$ is independently S, O, or N—$R^2$ wherein $R^2$ is hydrogen or $C_1$-$C_6$ alkyl; and E is O or $C(R^7)_2$, wherein each occurrence of $R^7$ is an electron withdrawing group.

Other suitable electroactive monomers (or oligomers) include those having the following general structure (XV):

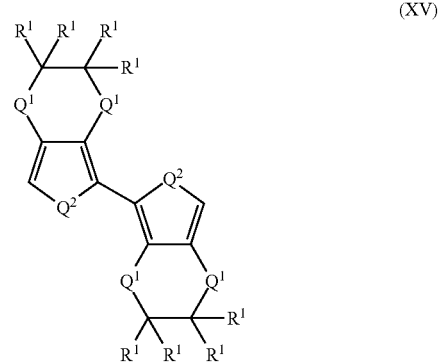
(XV)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $Q^1$ is O; each occurrence of $Q^2$ is S; and each occurrence of $R^1$ is hydrogen.

Additional electroactive monomers (or oligomers) include dithienovinylene, difuranylvinylene, and dipyrrolylvinylene according to the structure (XVI):

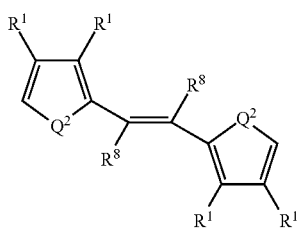
(XVI)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano.

Other electroactive monomers (or oligomers) include 1,2-trans(3,4-ethylenedioxythienyl)vinylene, 1,2-trans(3,4-ethylenedioxyfuranyl)vinylene, 1,2-trans(3,4ethylenedioxypyrrolyl)vinylene, and derivatives according to the structure (XVII):

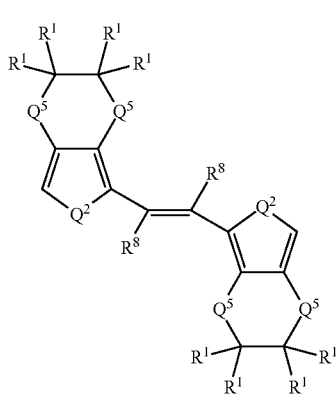

(XVII)

wherein each occurrence of $Q^5$ is independently $CH_2$, S, or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano.

Additional electroactive monomers (or oligomers) include the class of bis-thienylarylenes, bis-furanylarylenes, bis-pyrrolylarylenes and derivatives according to the structure (XVIII):

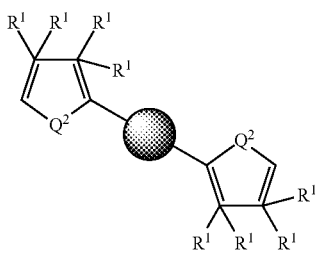

(XVIII)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

represents an aryl. Exemplary aryl groups include furan, pyrrole, N-substituted pyrrole, phenyl, biphenyl, thiophene, fluorene, 9-alkyl-9H-carbazole, and the like.

Other electroactive monomers (or oligomers) include the class of bis(3,4-ethylenedioxythienyl)arylenes, related compounds, and derivatives according to the structure (XIX):

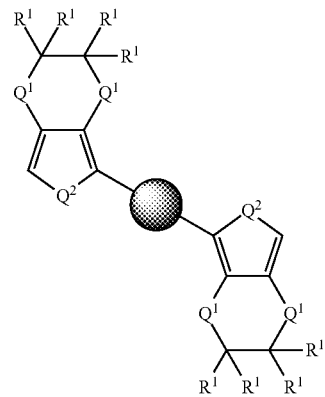

(XIX)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

represents an aryl.

Other exemplary electroactive monomers (or oligomers) include bis(3,4-ethylenedioxythienyl)arylenes according to structure (XIX) includes the compound wherein all $Q^1$ are O, both $Q^2$ are S, all $R^1$ are hydrogen, and

is phenyl linked at the 1 and 4 positions. Another exemplary compound is where all $Q^1$ are O, both $Q^2$ are S, all $R^1$ are hydrogen, and

is thiophene linked at the 2 and 5 positions (bisEDOT-thiophene).

Additional electroactive monomers (or oligomers) include the class of compounds according to structure (XX):

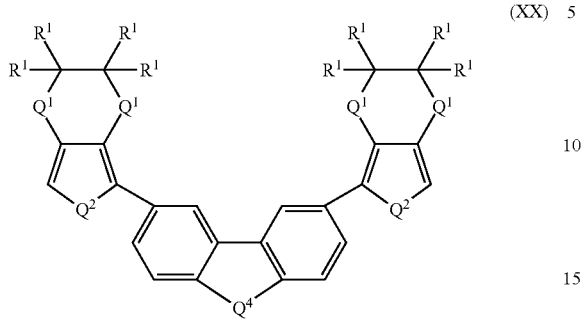

wherein each occurrence of $Q^1$ is independently S or O; each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $Q^1$ is O; each occurrence of $Q^2$ is S; each occurrence of $R^1$ is hydrogen; and $R^2$ is methyl.

Still other electroactive monomers (or oligomers) include the class of compounds according to structure (XXI):

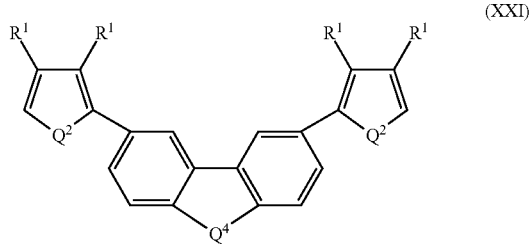

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional electroactive monomers include the class of compounds according to structure (XXII):

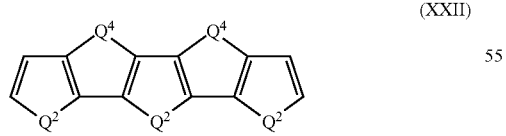

wherein each occurrence of $Q^2$ is independently S, O, or N—$R^2$ wherein $R^2$ is hydrogen or $C_1$-$C_6$ alkyl; each occurrence of $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Other exemplary monomers (or oligomers) include the class of compounds according to structure (XOH):

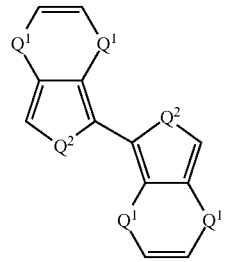

wherein each occurrence of $Q^2$ is independently S, O, or N—$R^2$ wherein $R^2$ is hydrogen or $C_1$-$C_6$ alkyl; and each occurrence of $Q^1$ is independently S or O.

Exemplary electroactive monomers include the class of compounds according to structure (XXIV):

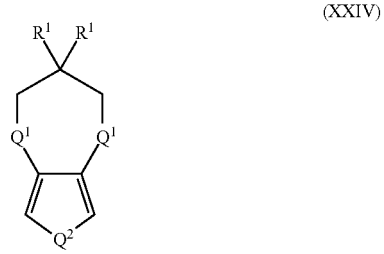

wherein $Q^2$ is S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-aryl, —$C_1$-$C_6$ alkyl-O-aryl, or —$C_1$-$C_6$ alkyl-O-aryl. In one embodiment, one $R^1$ is methyl and the other $R^1$ is benzyl, —$C_1$-$C_6$ alkyl-O-phenyl, —$C_1$-$C_6$ alkyl-O-biphenyl, or —$C_1$-$C_6$ alkyl-biphenyl.

Additional electroactive monomers (or oligomers) include the class of compounds according to structure (XXV):

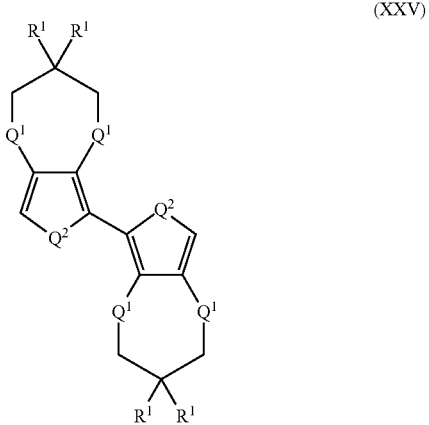

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, one $R^1$ is methyl and the other $R^1$ is —$C_1$-$C_6$ alkyl-O-phenyl or —$C_1$-$C_6$ alkyl-O-biphenyl per geminal carbon center.

Other electroactive monomers (or oligomers) include the class of compounds according to structure (XXVI):

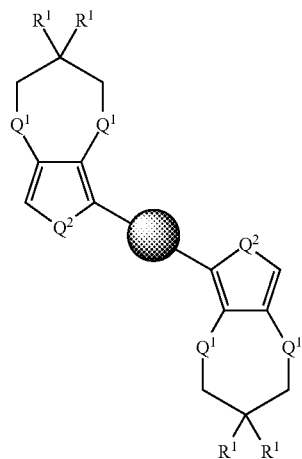

(XXVI)

wherein each occurrence of $Q^2$ is independently S, O, or N—$R^2$ wherein $R^2$ is hydrogen or $C_1$-$C_6$ alkyl; each occurrence of $Q^1$ is independently S or O; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

represents an aryl. In one embodiment, one $R^1$ is methyl and the other $R^1$ is —$C_1$-$C_6$ alkyl-O-phenyl or —$C_1$-$C_6$ alkyl-O-biphenyl per geminal carbon center.

Exemplary electroactive monomers include the class of compounds according to structure (XXVII):

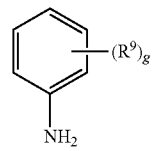

(XXVII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional electroactive monomers include the class of compounds according to structure (XXVIII):

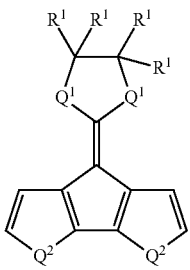

(XXVIII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Another electroactive monomer includes aniline or substituted aniline according to structure (XXIX):

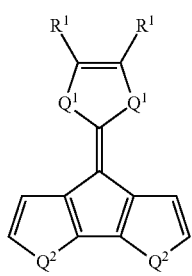

(XXIX)

wherein g is 0, 1, 2, or 3; and each occurrence of $R^9$ is independently $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-O-aryl, or N—$R^2$ wherein $R^2$ is hydrogen or $C_1$-$C_6$ alkyl.

In one embodiment, a single type of electroactive monomer is employed to form a homopolymer. In another embodiment, a combination of two or more electroactive monomer types is used in a copolymerization process to form a conducting copolymer. As used herein "conducting polymer" is inclusive of conducting homopolymers and conducting copolymers unless otherwise indicated. Furthermore, in one embodiment, the polymerization may be conducted with a mixture of an electroactive monomer and a non-electroactive monomer. Color tuning can be achieved in part by the choice of monomers for copolymerization.

In another embodiment, a conducting oligomer, a viologen, a conducting polymer precursor, or a combination thereof, can be used in the place of, or in addition to, the electroactive monomer. It is to be understood that all embodiments that describe the use of monomers, there is the corresponding embodiment wherein the monomer component is replaced with a conducting oligomer, a viologen, a conducting polymer precursor, or a combination thereof. As with the electroactive monomers, the conducting oligomer, viologen, conducting polymer precursor or a combination thereof can be used to form the in situ formed conjugated polymer, an electrodeposited conjugated polymer, or a solvent cast conjugated polymer.

As used herein, viologens include a 4,4'-dipyridinium salt according to structures (XXX) and (XXXI):

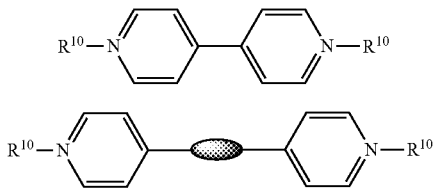

(XXX)

(XXXI)

wherein each occurrence of $R^{10}$ is independently $C_1$-$C_{12}$ alkyl, $C_1$-$C_{12}$ haloalkyl, aryl, —$C_1$-$C_6$ alkyl-O—$C_1$-$C_6$ alkyl, or —$C_1$-$C_6$ alkyl-O-aryl; and is $C_2$, $C_4$, or $C_6$ alkenylene, an aryl or heteroaryl, specifically two, three, four, or more aryl or heteroaryl groups lined together. Exemplary is phenylene, thiopene, and ethylene.

As used herein, a conducting polymer precursor includes a polymer or oligomer that can undergo further chain growth and/or crosslinking to produce the conjugated polymer.

Exemplary conducting polymer precursors include those of structures (XXXII) and (XXXIII):

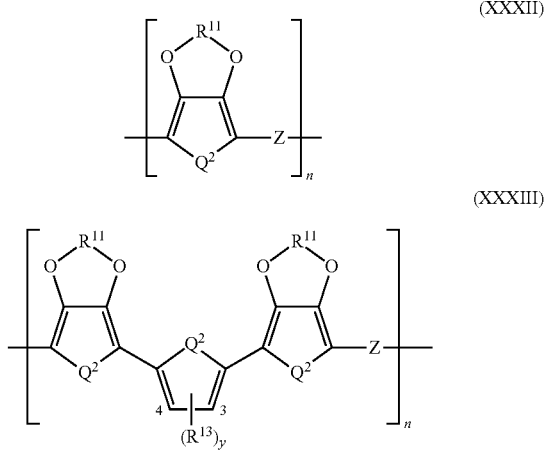

(XXXII)

(XXXIII)

wherein n is an integer greater than 0; y is 0, 1, or 2; $Q^2$ is independently S, O, or N—$R^2$ wherein $R^2$ is hydrogen or $C_1$-$C_6$ alkyl; $R^{11}$ is a $C_1$-$C_{20}$ alkylene group; Z is a silylene group, for example —Si($R^{12}$)$_2$— or —Si($R^{12}$)$_2$—O—Si($R^{12}$)$_2$—, wherein each $R^{12}$ independently is a $C_1$-$C_{20}$ alkyl; and $R^{13}$ is $C_1$-$C_{20}$ alkyl, $C_1$-$C_{20}$ alkoxy, $C_1$-$C_{20}$ thioalkyl, or $C_1$-$C_{20}$ aryl attached at the 3 and/or 4 position (shown) of the five-membered ring. $R^{12}$ can be, for example, methyl, ethyl, propyl, isopropyl, n-butyl, n-pentyl, n-hexyl, n-heptyl, or n-octyl. Exemplary $R^{13}$ include methyl, ethyl, propyl, isopropyl, n-butyl, n-pentyl, n-hexyl, n-heptyl, n-octyl, phenyl, n-butylthio, n-octylthio-, phenylthio-, and methoxyphenyl.

In one embodiment, n is an integer from 1 to 1000, y is 0, $R^{11}$ is ethylene (—$CH_2CH_2$—), each $Q^2$ is sulfur, Z is —Si($R^{12}$)$_2$—, and $R^{12}$ is n-octyl. This 2,5-bis[(3,4-ethylenedioxy)thien-2-yl]-thiophene (BEDOT-T) silylene precursor polymer can be formed by the nickel-catalyzed coupling of 3,4-ethylenedioxythiophene with dibromothiophene, to form BEDOT-T, followed by deprotonation of BEDOT-T using n-BuLi to form a dianion of BEDOT-T, and reacting the dianion with dichlorodioctylsilane to form the BEDOT-T silylene precursor polymer. The weight average molecular weight of the BEDOT-T silylene precursor polymer can be 1000 to 100,000 g/mole, more specifically 1,000 to 10,000 g/mole.

In another specific embodiment, n is an integer from 1 to 1000, y is 0, $R^{11}$ is 2,2-dimethylpropylene (—$CH_2C(CH_3)_2$ $CH_2$—), each $Q^2$ is sulfur, Z is —Si($R^{12}$)$_2$—O—Si($R^{12}$)$_2$—, and $R^{12}$ is methyl. This ProDOT-Me$_2$ silylene precursor polymer can be prepared by transesterification of 3,4-dimethoxythiophene with 2,2-dimethyl-1,3-propanediol using para-toluene sulfonic acid (PTSA) or dodecylbenzene sulfonic acid (DBSA) as catalysts in anhydrous toluene to form ProDOT-Me$_2$, deprotonating the ProDOT-Me$_2$ using 2 equivalents of n-BuLi to form the dilithium dianion, and reacting the dilithium dianion with dichlorotetramethylsiloxane to form the ProDOT-Me$_2$ silylene precursor polymer. The weight average molecular weight of the ProDOT-Me$_2$ silylene precursor polymer can be 1000 to 100,000 g/mole, more specifically 1,000 to 5000 g/mole.

In addition to the heterocyclic ring systems shown in the precursors of formulas (XXXII) and (XXXIII), other aromatic heterocycle groups, e.g., those of formulas (I)-(XXVIII), can also be synthesized with silylene of formula Z.

Other suitable conducting polymer precursors include polynorbornylene conducting polymer precursor having an electroactive group (e.g. an electroactive monomer or oligomer such as those described above) grafted onto the polymer backbone. Exemplary polynorbornylene conducting polymer precursors include those of structure (XXXIV):

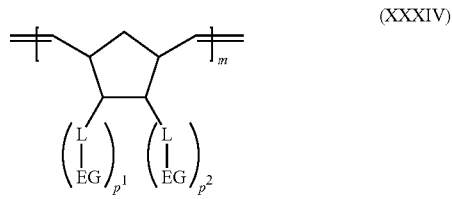

(XXXIV)

wherein L is a linking group containing 1-6 carbon atoms optionally interrupted by O, S, N($R^{14}$)$_2$, OC=O, C=OO, OC=OO, $NR^{14}$C=O, C=ON$R^{14}$, $NR^{14}$C=ON$R^{14}$, and the like, wherein $R^{14}$ is H, $C_1$-$C_{12}$ alkyl, $C_1$-$C_{12}$ haloalkyl, aryl, —$C_1$-$C_6$ alkyl-O—$C_1$-$C_6$ alkyl, or —$C_1$-$C_6$ alkyl-O-aryl; EG is an electroactive group; $p^1$ is 0 or 1; $p^2$ is 0 or 1 with the proviso that at least one of $p^1$ and $p^2$ is 1; and m is about 3 to about 3000.

The polynorbornylene can be prepared by polymerization of a norbornylene monomer such as structure (XXXV):

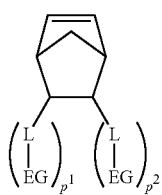

(XXXV)

wherein L, EG, $p^1$ and $p^2$ are as defined above. The polymerization to form the polynorbornylene can be accomplished via ring opening metathesis polymerization (ROMP) using an appropriate catalyst (e.g. Grubb's alkylidene catalyst).

Exemplary polynorbornylenes include those of structures (XXXVI) and (XXXVII):

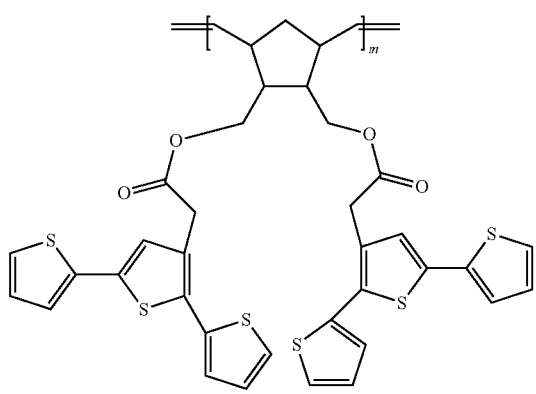

(XXXVI)

, or

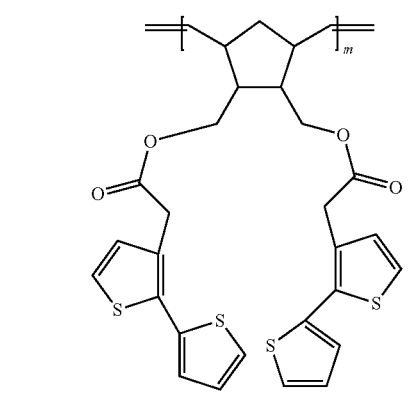

(XXXVII)

In another embodiment, the norbornylene monomer is used in combination with the electroactive monomer rather than the polynorbornylene conducting polymer precursor.

Additional electrochromic precursors are described, for example, in U.S. Pat. No. 7,321,012 to Sotzing, U.S. Patent Publs. 2007/0089845 to Sotzing et al., 2007/0008603 to Sotzing et al., and WO2007/008977 to Sotzing, the relevant disclosures of which are each incorporated by reference herein.

As used herein, electroactive oligomers include any dimer, trimer, or compound having multiple heterocycle units in length, wherein the heterocycle is an electroactive monomer. Exemplary oligomers have 2 to 10 units, specifically 2 to 7 units, and more specifically 2 to 3 units.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, "—CHO" is attached through carbon of the carbonyl group.

Unless otherwise indicated, the term "substituted" as used herein means replacement of one or more hydrogens with one or more substituents. Suitable substituents include, for example, hydroxyl, $C_6$-$C_{12}$ aryl, $C_3$-$C_{20}$ cycloalkyl, $C_1$-$C_{20}$ alkyl, halogen, $C_1$-$C_{20}$ alkoxy, $C_1$-$C_{20}$ alkylthio, $C_1$-$C_{20}$ haloalkyl, $C_6$-$C_{12}$ haloaryl, pyridyl, cyano, thiocyanato, nitro, amino, $C_1$-$C_{12}$ alkylamino, $C_1$-$C_{12}$ aminoalkyl, acyl, sulfoxyl, sulfonyl, amido, or carbamoyl.

As used herein, "alkyl" includes straight chain, branched, and cyclic saturated aliphatic hydrocarbon groups, having the specified number of carbon atoms, generally from 1 to about 20 carbon atoms, greater than 3 for the cyclic. Alkyl groups described herein typically have from 1 to about 20, specifically 3 to about 18, and more specifically about 6 to about 12 carbons atoms. Examples of alkyl include, but are not limited to, methyl, ethyl, n-propyl, isopropyl, n-butyl, 3-methylbutyl, t-butyl, n-pentyl, and sec-pentyl. As used herein, "cycloalkyl" indicates a monocyclic or multicyclic saturated or unsaturated hydrocarbon ring group, having the specified number of carbon atoms, usually from 3 to about 10 ring carbon atoms. Monocyclic cycloalkyl groups typically have from 3 to about 8 carbon ring atoms or from 3 to about 7 carbon ring atoms. Multicyclic cycloalkyl groups may have 2 or 3 fused cycloalkyl rings or contain bridged or caged cycloalkyl groups. Examples of cycloalkyl groups include cyclopropyl, cyclobutyl, cyclopentyl, or cyclohexyl as well as bridged or caged saturated ring groups such as norbornane or adamantane.

As used herein "haloalkyl" indicates both branched and straight-chain alkyl groups having the specified number of carbon atoms, substituted with 1 or more halogen atoms, generally up to the maximum allowable number of halogen atoms ("perhalogenated"). Examples of haloalkyl include, but are not limited to, trifluoromethyl, difluoromethyl, 2-fluoroethyl, and penta-fluoroethyl.

As used herein, "alkoxy" includes an alkyl group as defined above with the indicated number of carbon atoms attached through an oxygen bridge (—O—). Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

"Haloalkoxy" indicates a haloalkyl group as defined above attached through an oxygen bridge.

As used herein, the term "aryl" indicates aromatic groups containing only carbon in the aromatic ring or rings. Such aromatic groups may be further substituted with carbon or non-carbon atoms or groups. Typical aryl groups contain 1 or 2 separate, fused, or pendant rings and from 6 to about 12 ring atoms, without heteroatoms as ring members. Where indicated aryl groups may be substituted. Such substitution may include fusion to a 5 to 7-membered saturated cyclic group that optionally contains 1 or 2 heteroatoms independently chosen from N, O, and S, to form, for example, a 3,4-methylenedioxy-phenyl group. Aryl groups include, for example, phenyl, naphthyl, including 1-naphthyl and 2-naphthyl, and bi-phenyl.

As used herein "heteroaryl" indicates aromatic groups containing carbon and one or more heteroatoms chosen from N, O, and S. Exemplary heteroaryls include oxazole, pyridine, pyrazole, thiophene, furan, isoquinoline, and the like. The heteroaryl groups may be substituted with one or more substituents.

As used herein, "halo" or "halogen" refers to fluoro, chloro, bromo, or iodo.

As used herein, "arylene" includes any divalent aromatic hydrocarbon or two or more aromatic hydrocarbons linked by a bond, a heteroatom (e.g., O, S, S(=O), S(=O)$_2$, etc.), a carbonyl group, an optionally substituted carbon chain, a carbon chain interrupted by a heteroatom, and the like.

The electrolyte/standard dye/electroactive monomer mixture may optionally include an additional additive. The additive may be chosen so that it does not, unless desired, interfere with oxidative polymerization, interfere with color/contrast/switching, interfere with electrodes or other components in a degradative way. Exemplary additional additives may also be used in the combination of electrolyte, standard dye, and electroactive monomer, and include conductive fillers such as particulate copper, silver, nickel, aluminum, carbon black, graphene, carbon nanotubes, buckminister fullerene, and the like; non-conductive fillers such as talc, mica, wollastonite, silica, clay, dyes, pigments (zeolites), and the like.

The solid-state electrochromic devices may further include a variety of substrate materials (flexible or rigid) used to house the electrolyte/standard dye/electroactive monomer combination. Exemplary substrate materials include glass, plastic, silicon, a mineral, a semiconducting material, a ceramic, a metal, and the like, as well as a combination thereof. The substrate may be inherently conductive. Flexible substrate layers can be made from plastic. Exemplary plastics include polyethylene terephthalate (PET), poly(arylene ether), polyamide, polyether amide, etc. The substrate may include mirrored or reflective substrate material. A further advantage of the process is that the substrates do not require cleaning as compared to ITO substrates which need to be vigorously cleaned prior to immersion in an electrolyte bath otherwise any defect will cause unevenness of the film deposited.

Exemplary electrode materials for use in the electrochromic devices can include inorganic materials such as glass-indium doped tin oxide (glass-ITO), doped silicon, metals such as gold, platinum, aluminum, and the like, metal alloys such as stainless steel ("SS"), SS 316, SS316L, nickel and/or cobalt alloys such as Hastelloy-B® (Ni62/Mo28/Fe5/Cr/Mn/Si), Hastelloy-C®, and the like; and organic materials such as a conjugated polymer such as poly(3,4-ethylenedioxythiophene)-polystyrene sulfonate (PEDOT-PSS), conjugated polymers prepared from an electroactive monomer described herein, carbon black, carbon nanotubes, graphene, and the like.

In one embodiment, all of the electrodes are polyethylene terephthalate (PET)/indium-doped tin oxide (ITO) substrates.

The solid-state electrochromic device can generally be fabricated by encasing a layer of the combination of electrolyte composition, standard dye, and electroactive monomer between at least two electrodes, wherein the electrodes are in electrical communication with the layer of the combination.

The combination of electrolyte composition, standard dye, and electroactive monomer can be formed into a layer in the device by mixing the components to form a dispersion or solution, and applying the mixture to a substrate via conventional processes including ink jet printing, screen printing, roll to roll printing processes, reel to reel processing, spin coating, meniscus and dip coating, spray coating, brush coating, doctor blade application, curtain casting, drop casting, and the like.

In one embodiment, a device is assembled comprising a combination of a gel electrolyte precursor, standard dye, and an electroactive monomer disposed between a first electrode and a second electrode.

In another embodiment, a device is assembled by disposing a combination of a gel electrolyte precursor, standard dye, and a electroactive monomer on a first electrode, crosslinking the gel electrolyte precursor to form a first layer of crosslinked gel electrolyte, standard dye, and electroactive monomer, then adding a second layer of gel electrolyte precursor, optionally in combination with a standard dye, an electroactive monomer, or both, on top of the first layer of crosslinked gel electrolyte, standard dye, and electroactive monomer, and assembling a second electrode on the second layer to form a sealed, assembled device. Within this embodiment, the electroactive monomers can be polymerized before or after the crosslinking of the gel electrolyte precursor in the second layer. Such a device may form a dual-conjugated polymer device. Alternatively, monomers with different oxidation potentials may be exploited such that one material polymerizes on one electrode and the second is polymerized on the other electrode, each in situ.

The polymerization of the electroactive monomers (and optional conducting oligomer, viologen, conducting polymer precursor, or a combination thereof) can be effected by cyclic voltammetry (triangle wave voltammetry), chrono-coulometry/constant voltage, galvanostatic/constant current, or square-wave voltammetry (pulsed). In several embodiments, a reference electrode is fabricated inside the device. The potential (voltage) is applied to one electrode of the device for a sufficient time to substantially deplete the monomer from the combination of electrolyte composition, standard dye, and electroactive monomer. The formation of the conjugated polymer occurs on one electrode side, via diffusion through the electrolyte composition. In one embodiment, the conjugated polymer is not a discrete, thin film layer, as can be formed using electrodeposition methods, but rather is a blend or composite within the electrolyte composition.

In several embodiments, the device comprises an internal reference electrode system to result in a three-electrode cell. In one embodiment, the internal reference electrode is a silver wire pseudo-reference electrode embedded within the device to control voltage and prevent electrode damage (e.g., ITO degradation due to over-oxidation).

In another embodiment, a sealing means (e.g. a gasket) is provided between two substrates or electrodes to form an electrochromic device wherein an internal reference electrode is provided between the sealing means. The sealing means seals the device.

In one embodiment, by controlling the voltage, it may be possible to achieve layered color mixing of various monomers, to form dual-polymer devices with different polymer composites being formed on alternate electrodes, and to form complex gradient blends and copolymers. Varying the voltage, time of application, and/or method of polymerization, one may achieve these architectures.

In yet another embodiment, a method comprises polymerizing a first electroactive monomer on a first electrode using a first potential and then polymerizing a second electroactive monomer at a second electrode at a second potential different than the first potential. Such a process may create a dual-conjugated polymer device. Monomers with different oxidation potentials may be exploited such that one material polymerizes on one electrode at one applied voltage and the second is polymerized on the other electrode at another applied voltage, each in situ.

The devices can be sealed to prevent water, air, or other contaminant materials from entering the device, as well as to prevent loss of electrolyte composition/standard dye/electroactive monomer or electrolyte composition/standard dye/conjugated polymer. Sealing can be accomplished using an adhesive such as a polyurethane based UV curable resin or other suitable adhesive used in the formation of electrochromic devices.

The devices can optionally be patterned using a variety of techniques including using a blocking (aka "insulating") layer of material (e.g. blocking material applied by ink jet printing, spray-cast, etc.), drop-cast patterning, directed polymerization by the selective application of voltage, direct patterning, lithography, patterned electrode surfaces, and other related methods to result in the formation of complex electrochromic devices. High-resolution images can be created using the patterning. The entire region of the device can be patterned or alternatively, only a portion of the device. In one embodiment, the pattern generated may be in the form of a straight line, a curved line, a dot, a plane, or any other desirable geometrical shape. The pattern may be one dimensional, two dimensional or three dimensional if desired and may be formed upon the surface of the combination of electrolyte composition, standard dye, and conjugated polymer mixture as an embossed structure or embedded within (below) the surface of the combination.

The devices can be patterned using a blocking layer of material, such as a material that is insoluble in the electrolyte composition. Exemplary blocking materials include polystyrene, etc. The blocking material can be applied to the working electrode using spray-casting, drop-casting, ink jet, screen printing, roll to roll printing processes, reel to reel processing, spin coating, meniscus and dip coating, brush coating, doctor blade application, curtain casting, and the like. This layer now blocks the electrical field produced within the device upon application of voltage, which results in no polymer forming in these areas. The device, when in situ polymerized, will then be patterned around the blocking layer. When the device is switched, the blocking layer will remain constant as the electrochromic changes color around it. The blocking layer may be loaded with a dye, such that in one state, the electrochromic is the same color as the blocking layer but in another state it is not, thus allowing for the patterned image/lettering/numbering/etc to be reversibly "revealed" and "concealed" upon switching.

In the patterning process using selective application of voltage, an electrochemical atomic force microscope (AFM) tip can be used as an external counter electrode to supply the voltage. In an alternative embodiment, injection polymerization can be accomplished using a needle to supply both a voltage and the combination of an electroactive monomer and electrolyte composition.

In one embodiment, a nanolithographic pattern may be generated by utilizing electrochemical atomic force microscopy (AFM) to selectively polymerize the electroactive monomer. In this method, an AFM tip (coated with a conductor such as gold, platinum/iridium, carbon, optionally modified with carbon nanotubes) is used as a counter electrode. The AFM tip is either brought into contact with the combination of electrolyte composition and electroactive monomer or brought into the proximity of the combination of electrolyte composition and electroactive monomer without touching the combination, and a suitable voltage is applied between the electrochemical AFM tip and the substrate, which promotes polymerization of the electroactive monomer contacted by (or brought in close proximity to) the AFM tip.

In one embodiment, the device can be prepared with individually addressable electrode systems, thus allowing for pixilation of a device. Such devices are useful for simple display applications.

In one embodiment, the solid-state electrochromic device comprises a single composite layer of the conjugated polymer, standard dye, and crosslinked gel electrolyte composition.

For those embodiments where the devices are prepared from solvent cast conjugated polymers, the conjugated polymers may be formed into layers by first dissolving or dispersing the polymer and standard dye in an appropriate solvent. The solvent may include organic solvents such as aliphatic alcohols (e.g., methanol and ethanol); aliphatic ketones (e.g., acetone and methyl ethyl ketone); aliphatic carboxylic esters (e.g., ethyl acetate); aromatic hydrocarbons (e.g., toluene and xylene); aliphatic hydrocarbons (e.g., hexane); aliphatic nitriles (e.g., acetonitrile); chlorinated hydrocarbons (e.g., dichloromethane); aliphatic sulfoxides (e.g., dimethyl sulfoxide); and the like, as well as mixtures comprising at least one of the foregoing organic solvents. Aqueous solvents can also be used such as water or water combined with one or more water-miscible organic solvents such as lower alcohols, acetonitrile, tetrahydrofuran, dimethylacetamide, dimethyl formamide, and the like.

Dispersions or solutions containing the conjugated polymer and standard dye can be formed into films by applying the dispersions or solutions to a substrate via conventional processes including ink jet printing, screen printing, roll to roll printing processes, reel to reel processing, spin coating, meniscus and dip coating, spray coating, brush coating, doctor blade application, curtain casting, drop casting, and the like, to form a layer. Suitable substrates are solid materials (flexible or rigid) suitable for deposition of the polymeric compositions, and may be, for example, glass, an organic polymer such as a plastic, silicon, a mineral, a semiconducting material, a ceramic, a metal, and the like, as well as a combination comprising at least one of the foregoing materials. The substrate may be inherently conductive.

The liquid solvent may be removed from the layer of the dispersion or solution by conventional techniques to form a film comprising conjugated polymer and standard dye. Removal of the liquid may be effected at room temperature or other temperature that does not adversely affect the properties of the resulting film. However, to obtain higher processing speeds, the film can be dried at elevated temperatures.

The electrolyte and electrode materials previously discussed can be used in the device comprising solvent cast conjugated polymer and standard dye.

In the embodiment comprising an electrodeposited conjugated polymer, conventional methods of forming an electrodeposited conjugated polymer film can be used, but with the addition of the standard dye in the electroactive monomer and electrolyte bath to result in a film comprising the conjugated polymer and standard dye. In another embodiment, the standard dye can be applied to the surface of a pre-formed film of electrodeposited conjugated polymer.

In various embodiments, electrodeposition can occur at the cathode (i.e., the electrode where reduction takes place).

An exemplary apparatus for carrying out electrodeposition includes an anode, a cathode and, optionally, a reference electrode, each separated by an electrolyte solution, as well as a potentiostat which monitors/sets the voltages/currents at the various electrodes. Electrodeposition can be carried out under a variety of electrochemical conditions including the following, among others: (a) constant current, (b) constant voltage, (c) current scan/sweep, e.g., via a single or multiple scans/sweeps, (d) voltage scan/sweep, e.g., via a single or multiple scans/sweeps, (e) current square waves or other current pulse wave forms, (f) voltage square waves or other voltage pulse wave forms, and (g) a combination of different current and voltage parameters.

The electrolyte and electrode materials previously discussed can be used in the device comprising the electrodeposited conjugated polymer and standard dye.

For those electrochromic devices prepared from inorganic electrochromic materials, suitable materials include tungsten oxide ($WO_3$), molybdenum oxide ($MoO_3$), titanium dioxide ($TiO_2$), $Ta_2O_5$, and $Nb_2O_5$ or combinations thereof and the like.

In the embodiment where the standard dye is external to the at least two electrodes, the dye can be present in a film, coated on a substrate, or the like.

In an embodiment, the photostability of the electrochromic device can be improved by adding UV blockers to the device substrate such as by incorporation into a plastic of the substrate or through the use of a coating on glass substrate.

The electrochromic devices described herein find use in automotive applications including rear view mirrors, sunroofs, windows and the like; eyewear applications including goggles, sunglasses, and the like; architectural windows; smart glass; windows; displays; sensors; OLEDs; solar cells; and color change fabrics. Electrochromic devices that exhibit neutral color transitions are of special interest in the eyewear industry. For example, neutral grey lenses for use in military and consumer applications provide an unmitigated view of the environment without distorting original colors or affecting contrast. Their low brightness minimizes eye fatigue and develops a calm, non-distractive atmosphere.

The following illustrative examples are provided to further describe the invention and are not intended to limit the scope of the claimed invention.

EXAMPLES

Example 1

Preparation of Neutral Color Electrochromic Device

The standard dye used was a small molecule organic yellow dye (YG) was from Lanxess, Inc. (Macrolex Yellow G, C.I. Solvent Yellow 114, CAS #17772-51-9; molecular weight 289.28 g/mol). Electroactive monomer 3,4-ethylenedioxythiophene (EDOT) was purchased from Heraeus Clevios GmbH and was distilled under vacuum prior to use. The gel electrolyte components included lithium trifluoromethane sulfonate (LiTRIF), propylene carbonate (PC), poly(ethylene glycol)methyl ether acrylate ($M_n$=480 g/mol) (PEG-MA) and dimethoxyphenylacetophenone (DMPAP), all purchased from Sigma-Aldrich and used as received. Indium Tin Oxide (ITO) coated glasses (sheet resistance 8-12 Ohm/sq) were purchased from Delta Technologies and cleaned by acetone, isopropanol and methanol prior to use. ITO coated polyethylene terephthalate (PET) substrates were purchased from Bayview Optics and were cleaned by acetone prior to use. Copper tape was purchased from Newark and UV-sealant glue was purchased from Norland Optics.

A gel polymer electrolyte was prepared by adding together 1 g of LiTRIF, 3 g of PC, 7 g of PEG-MA and 17.5 mg of DMPAP and sonicated for 10 minutes until fully dissolved. Electroactive monomer liquid gel electrolyte was prepared by dissolving a 2.5 wt % ratio of EDOT into the gel polymer electrolyte.

Figure 2:
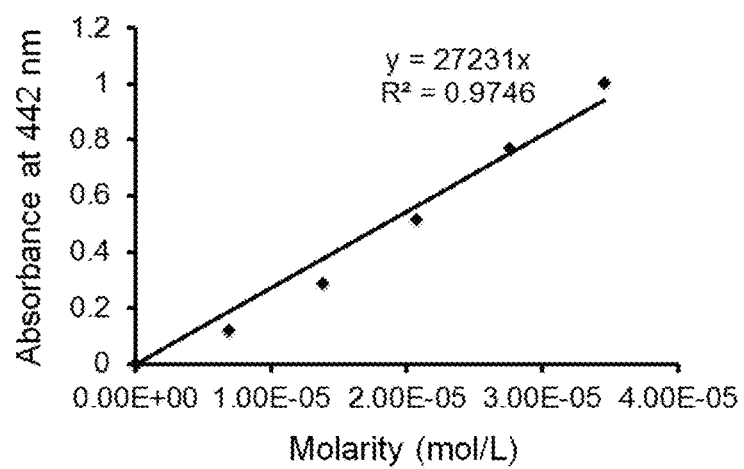
FIG. 2 Absorbance of standard dye YG at 442 nm as a function of YG molarity.

The molar absorptivity of YG was determined by monitoring the absorbance at 442 nm as a function of YG concentration in PC, the solvent for the gel polymer electrolyte. The results are shown in FIG. 2. The molar absorptivity is determined to be 27,231 $M^{-1} \cdot cm^{-1}$ under this wavelength.

To prepare the YG-incorporated gel electrolyte, a YG stock solution was first prepared by dissolving 5 mg of YG into 5 g of PC. Then 205 mg of YG stock solution was added into 10 g of the electroactive monomer gel polymer electrolyte mentioned above. Number of moles of YG loaded was calculated to be $7.08 \times 10^{-6}$ mol. The volume of the gel polymer electrolyte was determined to be 8.5 mL. The thickness of gel layer was 0.8 mm.

Therefore, the concentration of the $$YG = \frac{\text{number of moles of } YG}{\text{Volume}} = 8.34 \times 10^{-5} M.$$

According to the Beer-Lambert law, the absorbance of YG at 442 nm wavelength inside an assembled device=ε×b×c=0.182.

For further confirmation, absorbance at 442 nm of EDOT device (Abs=0.467) shown in FIG. 1 was subtracted from that of EDOT+YG device (Abs=0.279), giving the background corrected absorbance of YG. This absorbance is calculated to be 0.188, which agrees well with the calculated value.

Electrochromic device assembly: For small area device fabrication, ITO coated PET (2 cm×5 cm) was used as both working electrode and counter electrodes. The perimeter of one ITO/PET piece was covered with a rubber gasket (0.8 mm) to form the device active area (1.5×4.5 cm$^2$). The liquid monomer gel polymer electrolyte (or YG-incorporated gel electrolyte) was then drop cast onto this active area and another ITO/PET piece was placed on top. The device was placed inside an UV crosslinker (UVP CL-1000, 5.8 mW/cm$^2$) to cure the gel polymer electrolyte under 365 nm UV light for 20 minutes and sealed with UV curable glue. Under a constant potential of +3 V, the device was activated for 30 seconds time to achieve its closest proximity to the white point of the CIE xyY color space.

For large area device fabrication, a preassembled device frame sealed with epoxy adhesive was first built using 7.6 cm×20 cm ITO coated glass for both substrates. The YG-incorporated gel electrolyte was then injected into the device frame and followed by UV curing and an activation process as stated above.

All activated devices were switched between ±2 V (pulse width=2 s) for five cycles to switch the electrochromic polymer between its oxidized and neutral states before optical characterization.

Electrochemistry: Electrochemical conversions and spectro electrochemistry were carried out with a CHI 700 potentiostat.

Optical Characterization: Optical properties of assembled devices were measured with a Varian Cary 5000 UV-Vis-NIR spectrophotometer and corresponding built-in Color software. Colorimetric data were collected using a 10 degree standard observer angle in measurement range of 360-860 nm at 1 nm intervals based on a D65 standard illuminant.

In order to achieve neutral grey coloration in the assembled devices, the YG and the conjugated polymer absorbance intensities are balanced. A too-high yellow intensity is not desirable as it distorts the perception of color by the human eye and will affect the device's bleach state color. Device contrast will also be decreased due to the enhanced absorbance intensity in the bleached state. Conversely, a too-low yellow intensity will not be enough to tune the deep blue color of PEDOT towards neutral. Therefore, the information regarding molar absorptivity of YG (described above) was used to determine the required amount of YG to be placed within the gel electrolyte. The molar absorptivity of the YG was calculated to be 27230 M−1·cm−1 at 442 nm, based on which, the appropriate YG concentration was determined to be ca. 0.083 mM, giving an initial absorbance peak intensity of ca. 0.2 absorbance units (background corrected). The in situ method has also offered an approach to control the absorption intensity of PEDOT. The way that the electroactive monomers are directly converted inside assembled devices allows for stepwise polymerization. As a result, by controlling the device activation time, the PEDOT layer can reach the desired absorbance intensity.

Results

FIG. 1(a) and FIG. 1(b), respectively, show the spectral behavior of an in situ PEDOT device and an in situ PEDOT+YG device in the two extreme redox states. These two devices were activated for the same time, 30 seconds, under a constant potential of +3 V versus ground. As can be seen from FIG. 1(b), PEDOT absorption and YG absorption were balanced to about the same intensity. Compared with a normal PEDOT device, the PEDOT+YG device exhibits a broadened absorption, spanning the visible spectrum from 400 nm to 700 nm absorption, spanning the visible spectrum from 400 nm to 700 nm except for a gap from 460 nm to about 530 nm. Photopic contrasts were calculated for the two devices. The PEDOT+YG device has a photopic contrast of 30% (65.5% T to 35.5% T) as compared to the control PEDOT device photopic contrast of 30.5% (66.5% T to 36% T). Only a 0.5% photopic contrast loss was observed, which indicates that the application of YG did not sacrifice the original contrast of the polymer.

To evaluate the color changes, the colorimetric properties for each device were characterized by CIE 1931 xyY color space based on the standard D65 illuminant. The white point for this color space is x=y=0.333, which is equivalent to "black" at zero luminance, or white at high luminance (see FIG. 3(a) solid black circle). This central point is the target for neutral grey color electrochromics. The color coordinates for the PEDOT+YG device in the neutral state was determined to be x=0.291, y=0.317 (see FIG. 3(a) solid triangle). As shown in FIG. 3(b), the device exhibits a dark bluish-black color which is similar to previous reports. Upon oxidation, it bleaches to a transmissive pale yellow tint with color coordinates of x=0.332, y=0.359, very close to the white point (see FIG. 3(a) open triangle). The color of the PEDOT device in the neutral state was blue, with x=0.226, y=0.216 (see FIG. 3(a) solid square). Its transmissive sky blue oxidized state had color coordinates of x=0.309, y=0.329 (see FIG. 3(a) open square). As seen in FIG. 3(a), there is a clear color shift from the blue region to the yellow region. It is also clear that, with the aid of the YG, the neutral state of the device is moving towards the white point where the true color neutrality lies.

The switching kinetics of in situ PEDOT devices and in situ PEDOT+YG devices were studied by UV-Vis spectrophotometry upon the application of a double-potential step from −2 V to +2 V. Devices were repeatedly switched between their fully neutral and oxidized states using an 8 s time interval. The percent transmittance (% T) change at 555 nm, where the human eye has its highest sensitivity, was monitored as a function of time. The results are summarized in Table 1.

TABLE 1

Redox switching speeds for in situ PEDOT device and in situ PEDOT + YG device

| Device | Color state photopic transmittance | Bleach state photopic transmittance | Coloring Time (s) | Bleaching Time (s) |
|---|---|---|---|---|
| PEDOT | 34.5% | 66.5% | 1 | 2.5 |
| PEDOT + YG | 33.5% | 63.5% | 1.5 | 2.7 |

Figure 3:
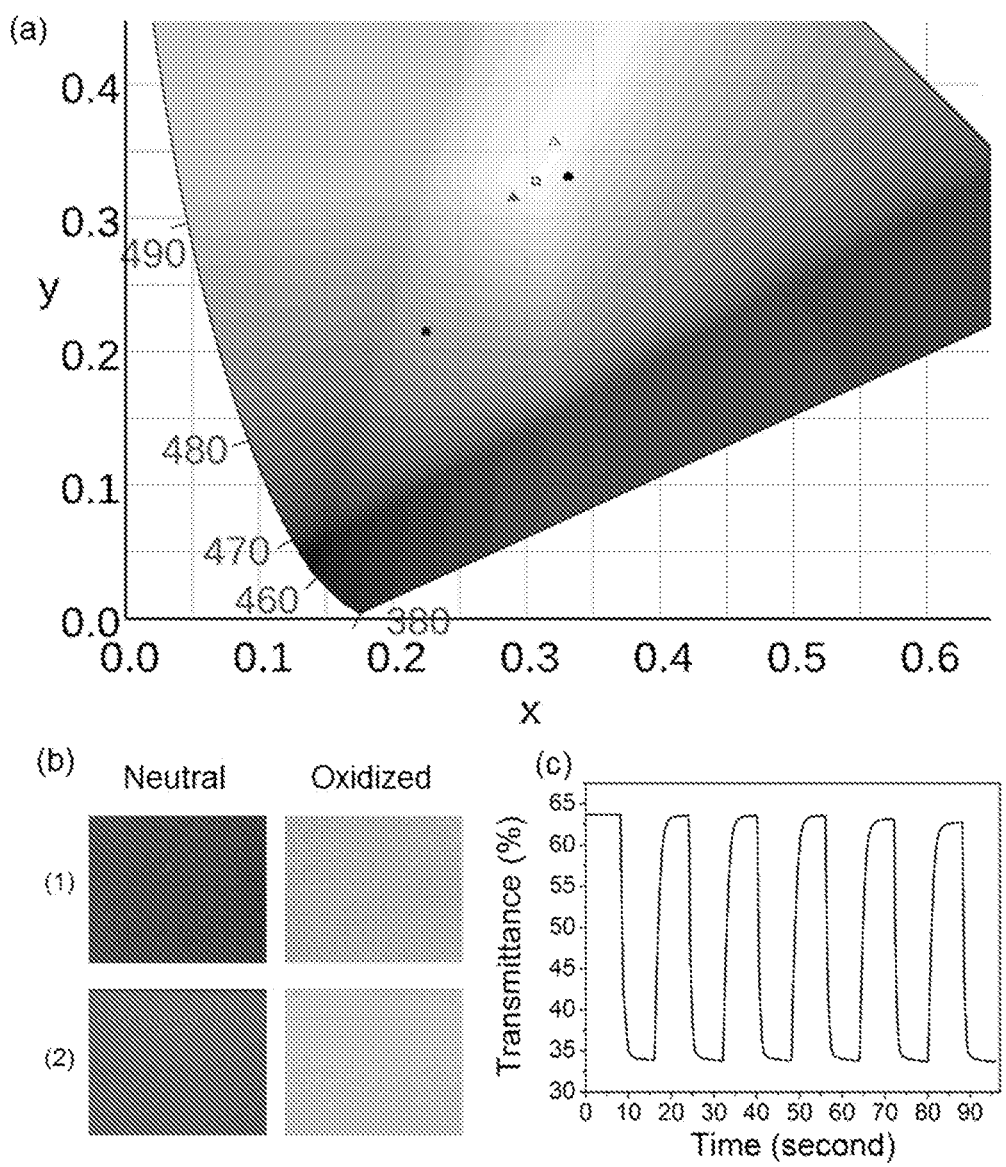
FIG. 3(a) color coordinates of in situ PEDOT device neutral state (solid square) and oxidized state (open square), in situ PEDOT+YG device neutral state (solid triangle) and oxidized state (open triangle), reference white point (solid black circle).
FIG. 3(b) images of (1) in situ PEDOT device and (2) in situ PEDOT+YG device.
FIG. 3(c) percent transmittance change at 555 nm for in situ PEDOT+YG device during constant potential stepping between −2 V~+2 V.

As shown in FIG. 3©, the device shows a full optical contrast of 30% (63.5% T to 33.5% T) at this wavelength. Switching speeds of the devices, here, were defined as the time required to achieve 95% of the full color change, since the human eye is sensitive up to 95% of the full contrast. Under these conditions, for a device with 1.5×4.5 cm² active area, the time required for coloring the device was calculated to be 1.5 s and the device exhibited a switch time to bleached state of 2.7 s. These values are comparable to the switching speed of the control PEDOT device of the same active area size, 1.5 s for coloring and 2.5 s for bleaching.

Figure 4:
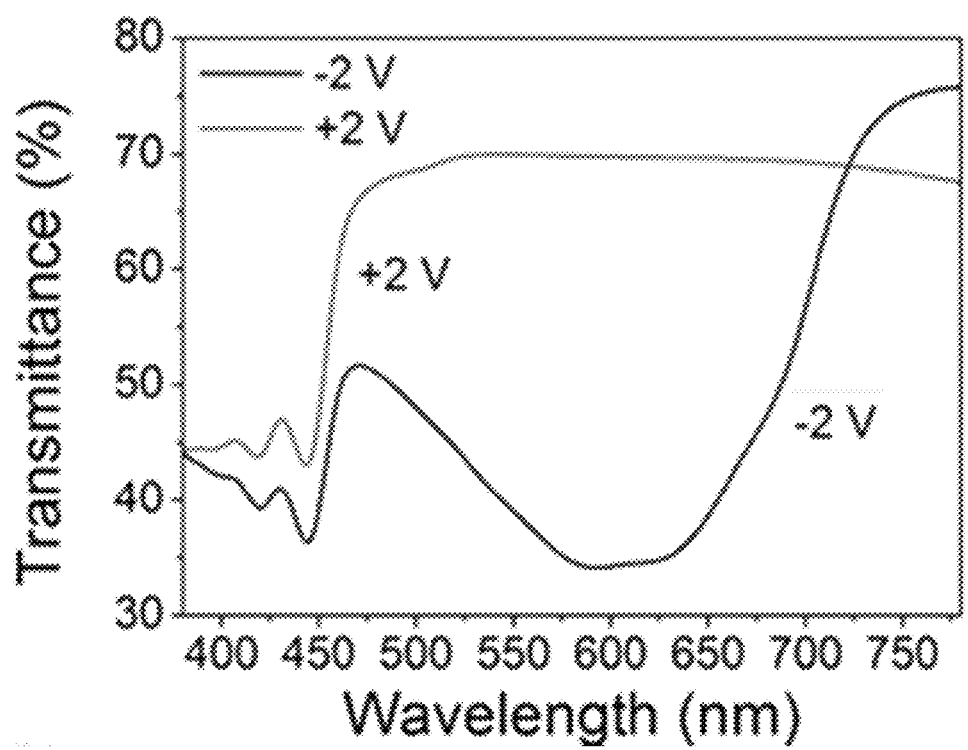
FIG. 4 percent transmittance of a 100 cm² in situ PEDOT+YG device in the neutral (−2 V) and oxidized (+2 V) states.

The in situ method allows for the preparation of large area devices. To date, common active switching area sizes for ECDs have been on the order of 2.5×2.5 cm². A PEDOT+YG optical defect-free ECD with 100 cm² (6 cm×16.7 cm) active area was prepared by injecting YG-dissolved electroactive monomer infused liquid electrolyte into preassembled device frames. ITO coated glass was used for both substrates. The percent transmittance of the device in the colored and bleached states across the visible region (380 nm to 780 nm) is shown in FIG. 4. In the colored state, at a device cell potential of −2 V vs. ground, the device exhibits a 39% photopic transmittance and in the bleached state, upon oxidation at +2 V vs. ground, the device exhibits a photopic transmittance of 70%. Thus, a photopic contrast of 31% was achieved, equivalent to that of the smaller-area 6.75 cm² devices.

The prepared devices exhibited photopic contrasts of ca. 30% without background correction when assembled on flexible PET-ITO substrates, switching speeds as low as 1 second, color uniformity, and stability. In addition, large defect free ECDs of 100 cm² were fabricated exceeding the active switch area required for goggles, lenses, and small display applications.

The singular forms "a," "an," and "the" include plural referents unless the context clearly dictates otherwise. Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention can include only some of the described embodiments. Accordingly, the invention is not to be seen as limited by the foregoing description, but is only limited by the scope of the appended claims.

What is claimed is:

1. An electrochromic device, comprising:
an electrochromic material and a standard dye disposed between at least two electrodes, or an electrochromic material disposed between at least two electrodes and a standard dye external to the at least two electrodes,
wherein the electrochromic material is a conjugated polymer, an inorganic electrochromic material, or an oligomeric electrochromic material, and
wherein the standard dye
is a solvent dye,
does not undergo redox (reduction or oxidation) processes within the potential window for operation of the electrochromic device, and
does not react with the electrochromic material.

2. The device of claim 1, wherein the electrochromic material is an electrodeposited conjugated polymer, a solvent cast conjugated polymer, or an in situ formed conjugated polymer.

3. The device of claim 1, wherein the device is a solid state electrochromic device or a liquid state electrochromic device.

4. The device of claim 1, wherein the standard dye is Solvent Yellow 1, Solvent yellow 114, Solvent Yellow 14, Solvent Yellow 16, Solvent yellow 163, Solvent yellow 176, Solvent Yellow 18, Solvent Yellow 2, Solvent Yellow 21, Solvent Yellow 3, Solvent Yellow 33, Solvent Yellow 34, Solvent Yellow 56, Solvent Yellow 62, Solvent Yellow 7, Solvent Yellow 72, Solvent Yellow 82, Solvent Yellow 93, Solvent yellow 98, Solvent Black 27, Solvent Black 29, Solvent Black 45, Solvent blue 104, Solvent blue 122, Solvent blue 35, Solvent blue 36, Solvent Blue 4, Solvent blue 59, Solvent blue 78, Solvent blue 97, Solvent Brown 1, Solvent Brown 2, Solvent Brown 3, Solvent Brown 4, Solvent Brown 5, Solvent green 28, Solvent Green 3, Solvent green 5, Solvent Green 7, Solvent orange 107, Solvent Orange 3, Solvent orange 60, Solvent Orange 62, Solvent orange 63, Solvent Orange 7, Solvent Orange 99, Solvent Red 1, Solvent Red 111, Solvent Red 122, Solvent Red 132, Solvent red 135, Solvent red 149, Solvent Red 168, Solvent red 179, Solvent red 196, Solvent red 197, Solvent red 207, Solvent Red 23, Solvent Red 24, Solvent red 242, Solvent red 27, Solvent Red 4, Solvent Red 49, Solvent Red 52, Solvent Red 8, Solvent Red 91, Solvent violet 13, Solvent Violet 14, Solvent violet 31, Solvent violet 36, Solvent Violet 58, Solvent violet 59, Solvent Violet 8, Solvent Violet 9, or a combination thereof.

5. A method of forming the electrochromic device of claim 1, comprising
placing a standard dye and an electrochromic material or electrochromic material precursor between at least two electrodes to form the electrochromic device.

6. A method of color tuning the electrochromic device of claim 1, comprising
selecting an electrochromic material;
selecting a standard dye that appropriately compliments or accentuates the electrochromic material in the bleached state, the colored state, or both; and
forming an electrochromic device comprising a combination of the electrochromic material and the standard dye disposed between at least two electrodes.

7. The electrochromic device of claim 1, wherein the standard dye appropriately compliments or accentuates the electrochromic material in the bleached state, the colored state, or both.

8. A method of forming a solid-state electrochromic device, comprising:
applying voltage to a device comprising at least two electrodes,
a combination of a crosslinked gel electrolyte composition, an electroactive monomer, and a standard dye, the combination disposed between the at least two electrodes, and
a potential source in electrical connection with the at least two electrodes;
wherein the applying voltage polymerizes the electroactive monomer to form a composite comprising conjugated polymer, standard dye, and crosslinked gel electrolyte composition;
and
wherein the standard dye is a solvent dye,
is soluble in a gel electrolyte precursor solvent used to prepare the crosslinked gel electrolyte composition,
does not undergo redox (reduction or oxidation) processes within the potential window for operation of the electrochromic device,
does not react with the conjugated polymer when oxidized, reduced, or neutral, and optionally appropriately compliments or accentuates the conjugated polymer in the bleached state, the colored state, or both.

9. The method of claim 8, further comprising tuning the electrochromic device to a neutral color transition by
determining molar absorptivity of the standard dye in the gel electrolyte precursor solvent;
determining molar absorptivity of the conjugated polymer; and
selecting a concentration of the standard dye in the gel electrolyte precursor solvent that balances the standard dye's absorbance intensity with the conjugated polymer's absorbance intensity.

10. The method of claim 8, wherein the standard dye is Solvent Yellow 1, Solvent yellow 114, Solvent Yellow 14, Solvent Yellow 16, Solvent yellow 163, Solvent yellow 176, Solvent Yellow 18, Solvent Yellow 2, Solvent Yellow 21, Solvent Yellow 3, Solvent Yellow 33, Solvent Yellow 34, Solvent Yellow 56, Solvent Yellow 62, Solvent Yellow 7, Solvent Yellow 72, Solvent Yellow 82, Solvent Yellow 93, Solvent yellow 98, Solvent Black 27, Solvent Black 29, Solvent Black 45, Solvent blue 104, Solvent blue 122, Solvent blue 35, Solvent blue 36, Solvent Blue 4, Solvent blue 59, Solvent blue 78, Solvent blue 97, Solvent Brown 1, Solvent Brown 2, Solvent Brown 3, Solvent Brown 4, Solvent Brown 5, Solvent green 28, Solvent Green 3, Solvent green 5, Solvent Green 7, Solvent orange 107, Solvent Orange 3, Solvent orange 60, Solvent Orange 62, Solvent orange 63, Solvent Orange 7, Solvent Orange 99, Solvent Red 1, Solvent Red 111, Solvent Red 122, Solvent Red 132, Solvent red 135, Solvent red 149, Solvent Red 168, Solvent red 179, Solvent red 196, Solvent red 197, Solvent red 207, Solvent Red 23, Solvent Red 24, Solvent red 242, Solvent red 27, Solvent Red 4, Solvent Red 49, Solvent Red 52, Solvent Red 8, Solvent Red 91, Solvent violet 13, Solvent Violet 14, Solvent violet 31, Solvent violet 36, Solvent Violet 58, Solvent violet 59, Solvent Violet 8, Solvent Violet 9, or a combination thereof.

11. The method of claim 8, wherein the device exhibits a neutral color transition.

12. The method of claim 8, wherein the electroactive monomer is thiophene, substituted thiophene, carbazole, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b]furan, bithiophene, substituted bithiophene, pyrrole, substituted pyrrole, acetylene, phenylene, substituted phenylene, naphthalene, substituted naphthalene, biphenyl and terphenyl and their substituted versions, phenylene vinylene (e.g., p-phenylene vinylene), substituted phenylene vinylene, aniline, substituted aniline, indole, substituted indole, or a combination thereof.

13. The method of claim 8, wherein the electroactive monomer is

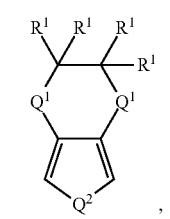 (I)

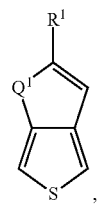 (II)

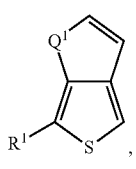 (III)

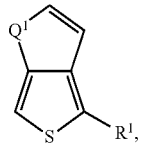 (IV)

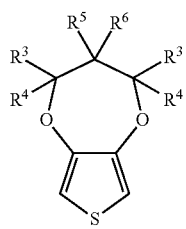 (V)

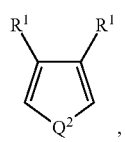 (VI)

-continued

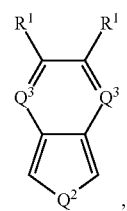 (VII)

 (VIII)

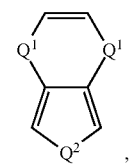 (IX)

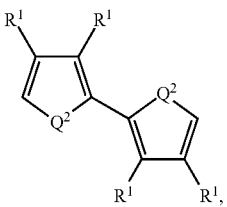 (X)

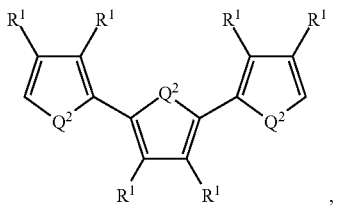 (XI)

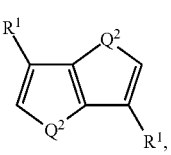 (XII)

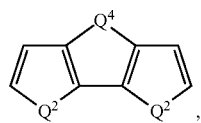 (XIII)

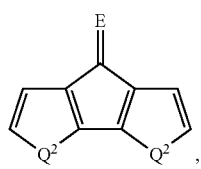 (XIV)

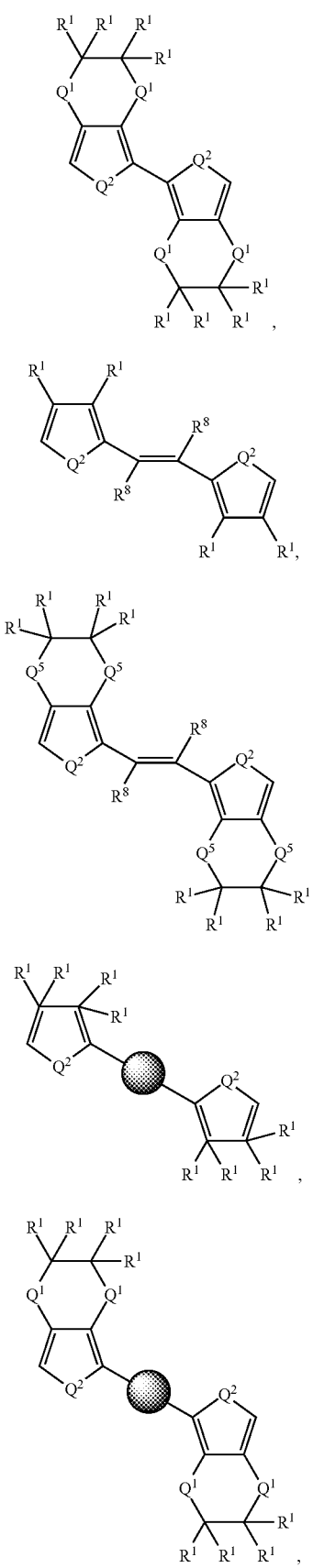
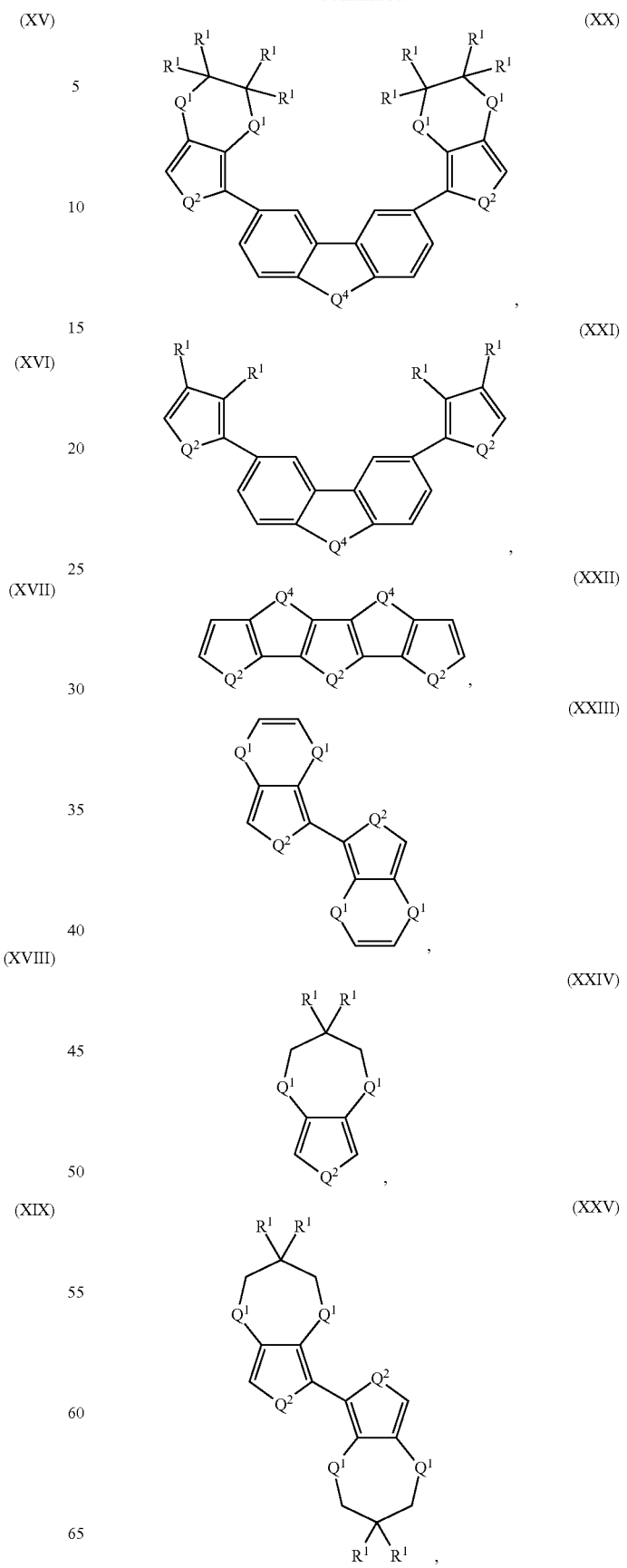

-continued (XXVI)

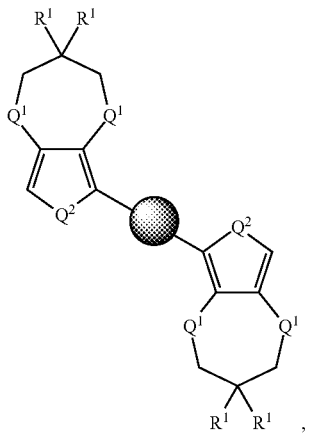

(XXVII)

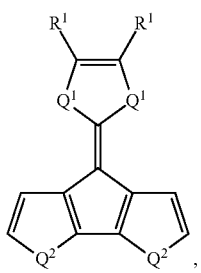

(XXVIII)

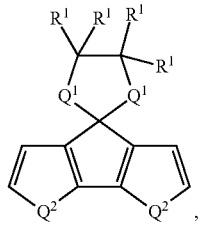

(XXIX)

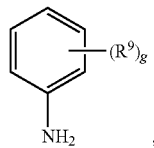

(XXX)

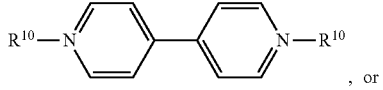

, or (XXXI)

wherein
each occurrence of $Q^1$ is independently S, O, or Se;
$Q^2$ is S, O, or N—$R^2$;
each occurrence of $Q^3$ is independently CH or N;
$Q^4$ is $C(R^1)_2$, S, O, or N—$R^2$;
each occurrence of $Q^5$ is independently $CH_2$, S, or O;
each occurrence of $R^1$ is independently hydrogen, $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl;
$R^2$ is hydrogen or $C_1$-$C_6$ alkyl;
each occurrence of $R^3$, $R^4$, $R^5$, and $R^6$ independently is hydrogen; optionally substituted $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, —$C_1$-$C_{10}$ alkyl-aryl; or hydroxyl;
each occurrence of $R^7$ is an electron withdrawing group;
each occurrence of $R^8$ is independently hydrogen, $C_1$-$C_6$ alkyl, or cyano;
each occurrence of $R^9$ is independently $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-O-aryl, or N—$R^2$;
each occurrence of $R^{10}$ is independently $C_1$-$C_{12}$ alkyl, $C_1$-$C_{12}$ haloalkyl, aryl, —$C_1$-$C_6$ alkyl-O—$C_1$-$C_6$ alkyl, or —$C_1$-$C_6$ alkyl-O-aryl;
E is O or $C(R^7)_2$;

represents an aryl;

is $C_2$, $C_4$, or $C_6$ alkenylene, an aryl or heteroaryl; and
g is 0, 1, 2, or 3.

14. The method of claim 8, wherein the crosslinked gel electrolyte composition comprises a lithium, sodium, or potassium salt, or an ionic liquid.

15. The method of claim 8, wherein the crosslinked gel electrolyte is formed by crosslinking a gel electrolyte precursor in the presence of the electroactive monomer and the standard dye to form a layer of crosslinked gel electrolyte comprising the electroactive monomer and the standard dye.

16. The method of claim 8, wherein the crosslinked gel electrolyte is prepared from a gel electrolyte precursor mixture comprising a gel electrolyte precursor, a solvent, and a salt or ionic liquid.

17. A solid-state electrochromic device prepared according to the method of claim 8.

18. A solid-state electrochromic device, comprising:
at least two electrodes; and
a composite disposed between the at least two electrodes, the composite comprising a conjugated polymer, a standard dye, and a crosslinked gel electrolyte composition;
wherein the composite is formed by in situ polymerization of an electroactive monomer in a combination comprising the crosslinked gel electrolyte composition, the standard dye, and the electroactive monomer, wherein the conjugated polymer is not formed as a discrete film; and
wherein the standard dye is a solvent dye,
is soluble in a gel electrolyte precursor solvent used to prepare the crosslinked gel electrolyte composition,
does not undergo redox (reduction or oxidation) processes within the potential window for operation of the electrochromic device,
does not react with the conjugated polymer when oxidized, reduced, or neutral, and
optionally appropriately compliments or accentuates the conjugated polymer in the bleached state, the colored state, or both.

19. The device of claim 18, wherein the device exhibits a neutral color transition.

20. The device of claim 18, wherein the standard dye is a quinoline dye.

21. The device of claim 18, wherein the standard dye is CI Yellow 114.

22. The device of claim 18, wherein the electroactive monomer is thiophene, substituted thiophene, carbazole, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b]furan, bithiophene, substituted bithiophene, pyrrole, substituted pyrrole, acetylene, phenylene, substituted phenylene, naphthalene, substituted naphthalene, biphenyl and terphenyl and their substituted versions, phenylene vinylene (e.g., p-phenylene vinylene), substituted phenylene vinylene, aniline, substituted aniline, indole, substituted indole, or a combination thereof.

23. The device of claim 18, wherein the electroactive monomer is

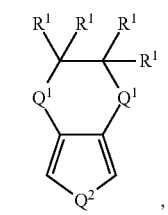
(I)

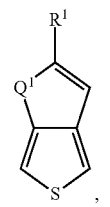
(II)

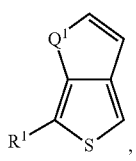
(III)

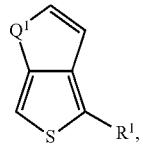
(IV)

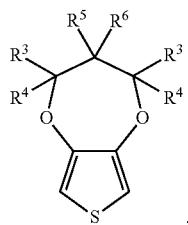
(V)

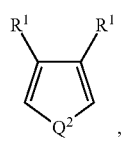
(VI)

-continued

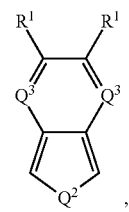
(VII)

(VIII)

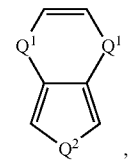
(IX)

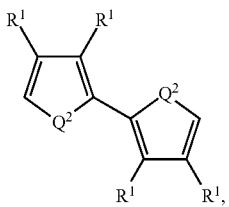
(X)

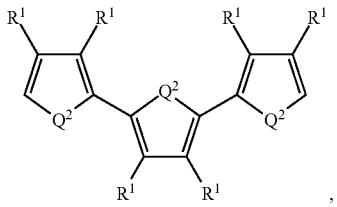
(XI)

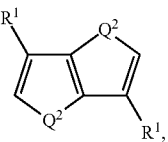
(XII)

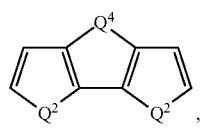
(XIII)

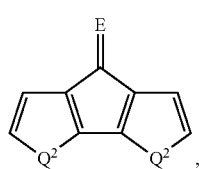
(XIV)

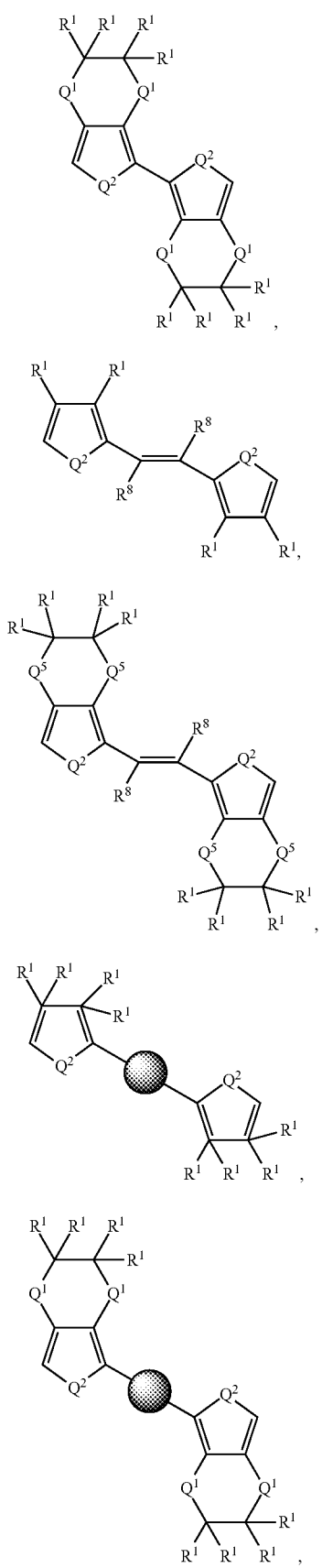
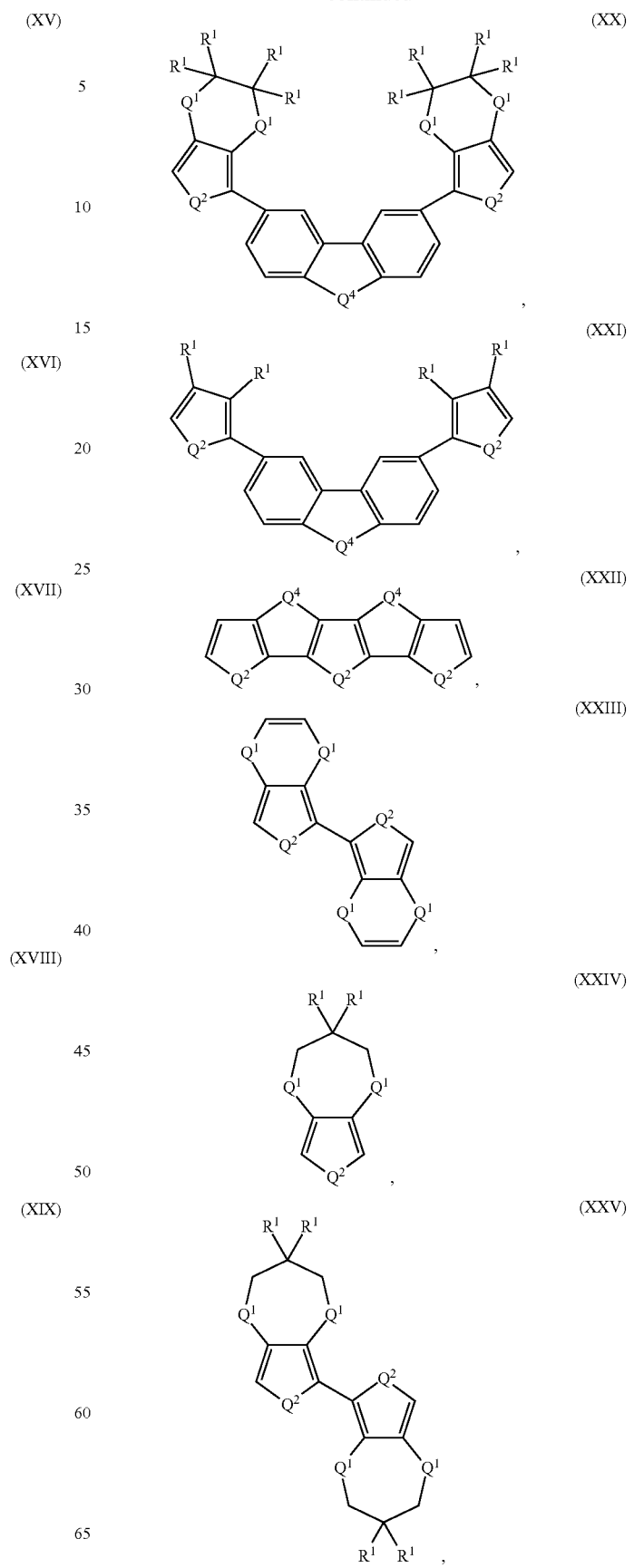

(XXVI) 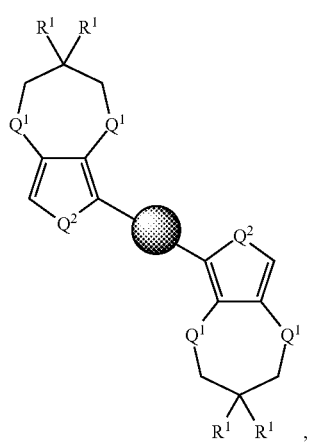

(XXVII) 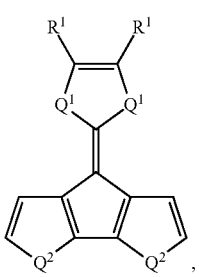

(XXVIII) 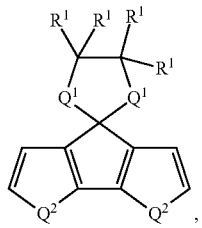

(XXIX) 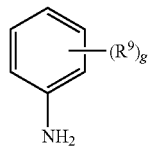

(XXX) 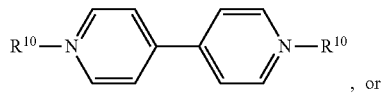, or (XXXI) 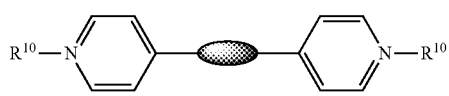

wherein
each occurrence of $Q^1$ is independently S, O, or Se;
$Q^2$ is S, O, or N—$R^2$;
each occurrence of $Q^3$ is independently CH or N;
$Q^4$ is $C(R^1)_2$, S, O, or N—$R^2$;
each occurrence of $Q^5$ is independently $CH_2$, S, or O;
each occurrence of $R^1$ is independently hydrogen, $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, aryl, —$C_1$-$C_6$ alkyl-O-$C_1$-$C_6$ alkyl, or —$C_1$-$C_6$ alkyl-O-aryl;
$R^2$ is hydrogen or $C_1$-$C_6$ alkyl;
each occurrence of $R^3$, $R^4$, $R^5$, and $R^6$ independently is hydrogen; optionally substituted $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, —$C_1$-$C_{10}$ alkyl-aryl; or hydroxyl;
each occurrence of $R^7$ is an electron withdrawing group;
each occurrence of $R^8$ is independently hydrogen, $C_1$-$C_6$ alkyl, or cyano;
each occurrence of $R^9$ is independently $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-O-aryl, or N—$R^2$;
each occurrence of $R^{10}$ is independently $C_1$-$C_{12}$ alkyl, $C_1$-$C_{12}$ haloalkyl, aryl, —$C_1$-$C_6$ alkyl-O—$C_1$-$C_6$ alkyl, or —$C_1$-$C_6$ alkyl-O-aryl;
E is O or $C(R^7)_2$;

represents an aryl;

is $C_2$ $C_4$ or $C_6$ alkenylene, an aryl or heteroaryl; and
g is 0, 1, 2, or 3.

24. The device of claim 18, wherein the crosslinked gel electrolyte composition comprises a lithium, sodium, or potassium salt, or an ionic liquid.

25. The device of claim 18, wherein the crosslinked gel electrolyte is formed by crosslinking a gel electrolyte precursor in the presence of the electroactive monomer and the standard dye to form a layer of crosslinked gel electrolyte comprising the electroactive monomer and the standard dye.

26. The device of claim 18, wherein the crosslinked gel electrolyte is prepared from a gel electrolyte precursor mixture comprising a gel electrolyte precursor, a solvent, and a salt or ionic liquid.

* * * * *